United States Patent
Aiba et al.

(10) Patent No.: US 10,574,408 B2
(45) Date of Patent: Feb. 25, 2020

(54) TERMINAL APPARATUS, BASE STATION APPARATUS, COMMUNICATION METHOD, AND INTEGRATED CIRCUIT

(71) Applicants: SHARP KABUSHIKI KAISHA, Sakai, Osaka (JP); FG Innovation Company Limited, Tuen Mun (HK)

(72) Inventors: Tatsushi Aiba, Sakai (JP); Shoichi Suzuki, Sakai (JP)

(73) Assignees: SHARP KABUSHIKI KAISHA, Sakai, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/095,898

(22) PCT Filed: Mar. 9, 2017

(86) PCT No.: PCT/JP2017/009541
§ 371 (c)(1),
(2) Date: Oct. 23, 2018

(87) PCT Pub. No.: WO2017/187810
PCT Pub. Date: Nov. 2, 2017

(65) Prior Publication Data
US 2019/0132093 A1 May 2, 2019

(30) Foreign Application Priority Data
Apr. 26, 2016 (JP) .................... 2016-087788

(51) Int. Cl.
*H04W 72/04* (2009.01)
*H04L 1/18* (2006.01)
(Continued)

(52) U.S. Cl.
CPC .......... *H04L 1/1893* (2013.01); *H04L 1/1887* (2013.01); *H04L 5/0055* (2013.01);
(Continued)

(58) Field of Classification Search
CPC ... H04L 1/1893; H04L 1/1887; H04L 5/0055; H04L 5/001; H04W 76/11; H04W 72/0406; H04W 72/0446
See application file for complete search history.

(56) References Cited

U.S. PATENT DOCUMENTS

2017/0019237 A1 1/2017 Yang et al.
2018/0159675 A1* 6/2018 Yang .................... H04L 5/00
(Continued)

FOREIGN PATENT DOCUMENTS

EP 3319259 A1 5/2018
WO 2015/147544 A1 10/2015

OTHER PUBLICATIONS

Nokia Corporation, NTT Docomo Inc., Nokia Networks, "New WI proposal: LTE Carrier Aggregation Enhancement Beyond 5 Carriers", RP-142286, 3GPP TSG RANMeeting #66, Hawaii, United States of America, Dec. 8-11, 2014.
(Continued)

*Primary Examiner* — Melvin C Marcelo
(74) *Attorney, Agent, or Firm* — ScienBiziP, P.C.

(57) ABSTRACT

Uplink control information is efficiently transmitted. In a terminal apparatus, HARQ-ACK is transmitted by using a first PUCCH format in a case that first information is received, a PDCCH used for scheduling of a PDSCH transmission only on a primary cell is detected in a CSS on the primary cell, and a counter DAI value included in a downlink assignment is set to 1, and HARQ-ACK is transmitted by using the first PUCCH format in a case that the first information is received, a PDCCH used for scheduling of a PDSCH transmission only on the primary cell is detected in a USS on the primary cell, and both a counter DAI value and a total DAI value included in a downlink assignment are set to 1.

8 Claims, 14 Drawing Sheets

(51) Int. Cl.
  *H04W 28/04* (2009.01)
  *H04W 76/11* (2018.01)
  *H04L 5/00* (2006.01)

(52) U.S. Cl.
  CPC .......... *H04W 28/04* (2013.01); *H04W 72/04* (2013.01); *H04W 72/0406* (2013.01); *H04W 72/0446* (2013.01); *H04W 76/11* (2018.02); *H04L 5/001* (2013.01)

(56) References Cited

U.S. PATENT DOCUMENTS

2018/0160413 A1* 6/2018 Papasakellariou .. H04W 72/042
2018/0206224 A1* 7/2018 Hwang ................... H04L 27/26

OTHER PUBLICATIONS

Samsung, "Remaining Issues on HARQ-ACK Codebook Determination", R1-162645, 3GPP TSG RAN WG1 #84bis Busan, Korea, Apr. 11-15, 2016.

* cited by examiner

DCI format is used for the scheduling of one PDSCH codeword in one cell.
E.g.
The following information is transmitted by means of the DCI format:
- Carrier indicator – 0 or 3 bits.
- Resource allocation header (resource allocation type 0 / type 1) – 1 bit
- Resource block assignment:
- Modulation and coding scheme – 5 bits
- HARQ process number
- New data indicator – 1 bit
- Redundancy version – 2 bits
- TPC command for PUCCH – 2 bits
- Downlink Assignment Index – number of bits as specified in Figure.4

FIG. 3

Number of bits for Downlink Assignment Index (DAI)

| Number of bits | |
|---|---|
| 4 | For UEs configured by higher layers with *codebooksizeDetermination-r13* = *dai* and when a DCI format scheduling PDSCH is mapped onto the UE specific search space given by the C-RNTI, the 4-bit DAI further consists of a 2-bit counter DAI and a 2-bit total DAI.<br><br>- Counter DAI – 2 bits<br><br>- Total DAI – 2 bits |
| 2 | For UEs configured with no more than five DL cells, or<br><br>for UEs configured by higher layers with *codebooksizeDetermination-r13* = *cc*, or<br><br>for UEs configured by higher layers with *codebooksizeDetermination-r13* = *dai* and when a DCI format scheduling PDSCH is not mapped onto the UE specific search space given by the C-RNTI (i.e. a DCI format scheduling PDSCH is mapped onto the common search space),<br><br>- this field is present (e.g. as Counter DAI – 2 bits) for TDD operation, and TDD-FDD operation (TDD primary cell). |
| 0 | For UEs configured with no more than five DL cells, or<br><br>for UEs configured by higher layers with *codebooksizeDetermination-r13* = *cc*, or<br><br>for UEs configured by higher layers with *codebooksizeDetermination-r13* = *dai* and when a DCI format scheduling PDSCH is not mapped onto the UE specific search space given by the C-RNTI (i.e. a DCI format scheduling PDSCH is mapped onto the common search space),<br><br>- this field is not present for FDD operation, and TDD-FDD operation (FDD primary cell). |

FIG. 4

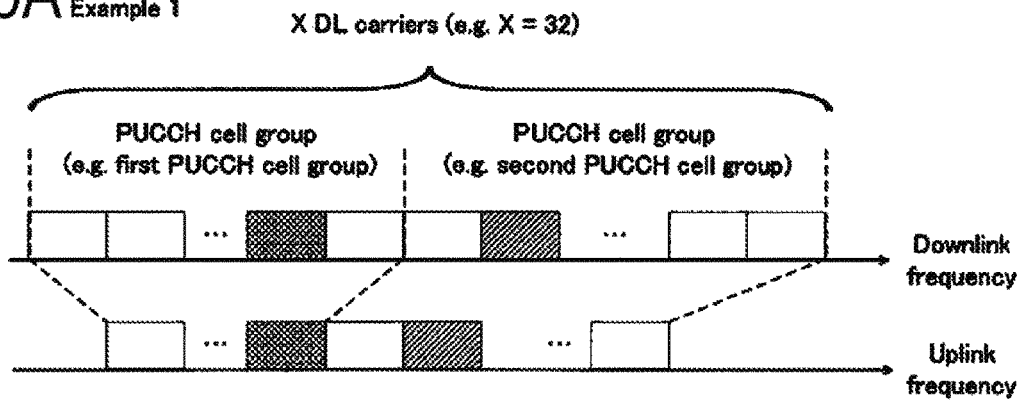
FIG. 5A Example 1
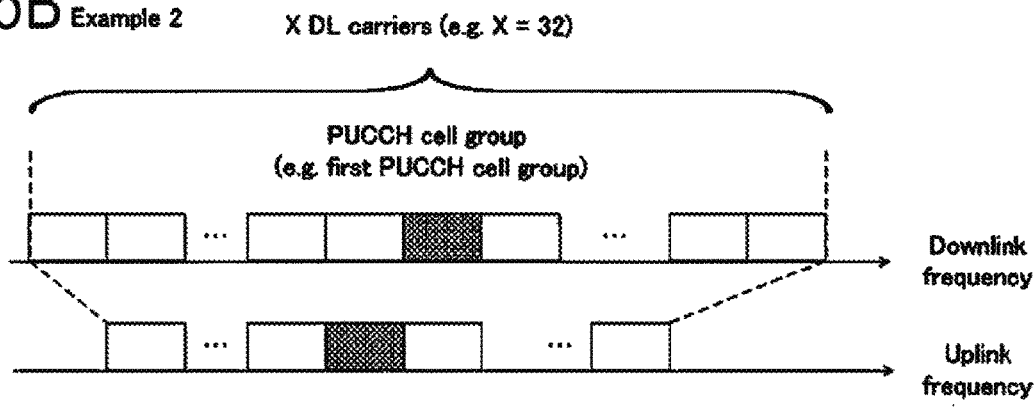
FIG. 5B Example 2
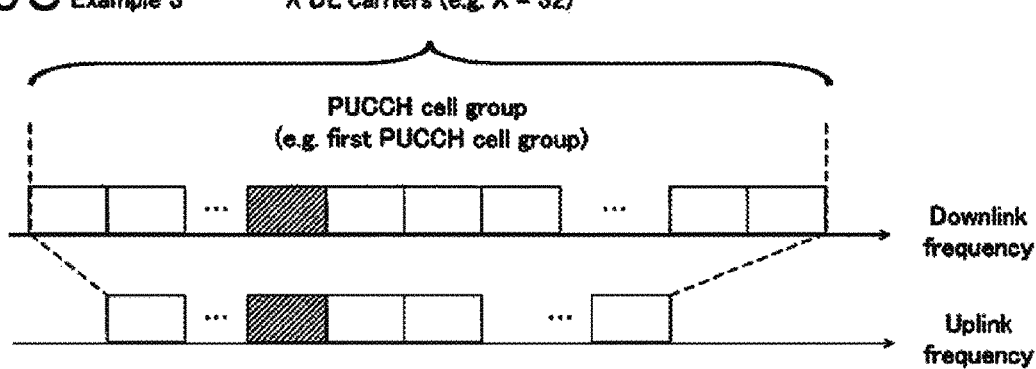
FIG. 5C Example 3

For FDD

If the UE is configured with *codebooksizeDetermination-r13 = 0*,

- for a PDSCH transmission only on the primary cell indicated by the detection of a corresponding PDCCH on CSS of PCell in subframe n-4, the UE shall use PUCCH format 1 and PUCCH resource 1

- for a PDSCH transmission only on the primary cell indicated by the detection of a corresponding PDCCH (on USS of PCell) in subframe n-4 and both the counter DAI value and the total DAI value in the PDCCH are equal to '1', the UE shall use PUCCH format 1 and PUCCH resource 1

- for a PDSCH transmission on the secondary cell indicated by the detection of a corresponding PDCCH/EPDCCH in subframe n-4, or for a PDSCH transmission only on the primary cell indicated by the detection of a corresponding PDCCH in subframe n-4 and either the counter DAI value or the total DAI value in the PDCCH is greater than '1', o the total number of HARQ-ACK bits and scheduling request bit (if any) and periodic CSI bits (if any) is more than 22, the UE shall use PUCCH format 4 and PUCCH resource 4 o if the total number of HARQ-ACK bits and scheduling request bit (if any) and periodic CSI bits (if any) is no more than 22, the UE shall use PUCCH format 3 and PUCCH resource 3

If the UE is configured with *codebooksizeDetermination-r13 = 1*,

- for a PDSCH transmission only on the primary cell indicated by the detection of a corresponding PDCCH in subframe n-4, the UE shall use PUCCH format 1 and PUCCH resource 1

- for a PDSCH transmission on the secondary cell indicated by the detection of a corresponding PDCCH/EPDCCH in subframe n-4, the UE shall use PUCCH format 4 and PUCCH resource 4

FIG. 7

TDD

If the is UE configured with *codebooksizeDetermination-r13* = 0,

- for a single PDSCH transmission only on the primary cell indicated by the detection of a corresponding PDCCH on CSS of PCell in subframe $n-k_i$, where $k_i \in K$, and the counter DAI value in the PDCCH is equal to '1', or
- for a single PDSCH transmission only on the primary cell indicated by the detection of a corresponding PDCCH (on USS of PCell) in subframe $n-k_i$, where $k_i \in K$, and both of the counter DAI value and the total DAI value in the PDCCH are equal to '1',
  ○ the UE shall use PUCCH format 1a/1b and PUCCH resource 1
- if a PDCCH transmission is indicated by the detection of a corresponding PDCCH in subframe $n-k_i$, where $k_i \in K$ with either the counter DAI value or the total DAI value in the PDCCH greater than '1' on the primary cell, or
- if a PDSCH transmission is indicated by the detection of a corresponding PDCCH in subframe $n-k_i$, where $k_i \in K$ on a secondary cell,
  ○ if the total number of HARQ-ACK bits and scheduling request bit (if any) and periodic CSI bits (if any) is more than 22, the UE shall use PUCCH format 4 and PUCCH resource 4
  ○ if the total number of HARQ-ACK bits and scheduling request bit (if any) and periodic CSI bits (if any) is no more than 22, the UE shall use PUCCH format 3 and PUCCH resource 3

FIG. 8

TDD

If the UE is configured with *codebooksizeDetermination-r13* = 1,

- for a single PDSCH transmission only on the primary cell indicated by the detection of a corresponding PDCCH in subframe $n-k$, where $k \in K$, and for a TDD UL/DL configuration of the primary cell belonging to {1,2,3,4,5,6} and the DAI value in the PDCCH is equal to '1', ○ the UE shall use PUCCH format 1 and PUCCH resource 1

- for a PDSCH transmission only on the primary cell indicated by the detection of a corresponding PDCCH in subframe $n-k_u$, where $k \in K$ with the DAI value in the PDCCH greater than '1', or

- If the UL/DL configurations of all serving cells are the same, for a PDSCH transmission on the secondary cell indicated by the detection of a corresponding PDCCH within subframe(s) $n-k$, where $k \in K$, or

- If the UL/DL configurations of at least two serving cells are different, for a PDSCH transmission on the secondary cell indicated by the detection of a corresponding PDCCH within subframe(s) $n-k$, where $k \in K$, ○ the UE shall use PUCCH format 4 and PUCCH resource 4

FIG. 9

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-087788 filed on Apr. 26, 2016, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied. In LTE, a base station apparatus is also referred to as an evolved NodeB (eNodeB), and a terminal apparatus is also referred to as a User Equipment (UE). LTE is a cellular communication system in which multiple areas each covered by the base station apparatus are deployed to form a cellular structure.

LTE supports a Time Division Duplex (TDD). LTE that employs the TDD scheme is also referred to as TD-LTE or LTE TDD. In TDD, uplink signals and downlink signals are time division multiplexed. Also, LTE supports a Frequency Division Duplex (FDD).

In 3GPP, a configuration where a terminal apparatus simultaneously performs transmission and/or reception on more than five serving cells (component carriers) has been considered. Furthermore, a configuration where a terminal apparatus transmits a physical uplink control channel on a secondary cell which is a serving cell other than the primary cell has been considered (NPL 1).

CITATION LIST

Non Patent Literature

NPL 1: "New WI proposal: LTE Carrier Aggregation Enhancement Beyond 5 Carriers", RP-142286, Nokia Corporation, NTT DoCoMo Inc., Nokia Networks, 3GPP TSG RAN Meeting, #66, Hawaii. United States of America, 8-11 Dec. 2014.

SUMMARY OF INVENTION

Technical Problem

However, for the radio communication system as described above, a concrete method when transmitting uplink control information has not been sufficiently discussed.

The present invention has been made in light of the foregoing, and an object of the present invention is to provide a terminal apparatus, a base station apparatus, a communication method, and an integrated circuit, which enable efficient transmission of uplink control information.

Solution to Problem (1) To accomplish the object described above, aspects of the present invention are contrived to provide the following measures. Specifically, a terminal apparatus according to an aspect of the present invention includes: a reception unit configured to receive higher layer signaling including first information for configuring that the number of bits of HARQ-ACK is determined based on downlink assignment, and to receive the downlink assignment on a PDCCH; and a transmission unit configured to transmit the HARQ-ACK, wherein the transmission unit transmits the HARQ-ACK by using a first PUCCH format in a case that the first information is received, a PDCCH used for scheduling of a PDSCH transmission only on a primary cell is detected in a CSS on the primary cell, and a counter DAI value included in the downlink assignment is set to 1, transmits the HARQ-ACK by using the first PUCCH format in a case that the first information is received, the PDCCH used for scheduling of the PDSCH transmission only on the primary cell is detected in a USS on the primary cell, and both the counter DAI value and a total DAI value included in the downlink assignment are set to 1, and transmits the HARQ-ACK by using one of a third PUCCH format and a fourth PT TCCH format in a case that the first information is received, the PDCCH used for scheduling of the PDSCH transmission only on the primary cell is detected, and either the counter DAI value or the total DAI value included in the downlink assignment is set to a value greater than 1.

(2) A base station apparatus according to an aspect of the present invention includes: a transmission unit configured to transmit higher layer signaling including first information for configuring that the number of bits of HARQ-ACK is determined based on downlink assignment, and to transmit the downlink assignment on a PDCCH; and a reception unit configured to receive the HARQ-ACK, wherein the reception unit receives the HARQ-ACK by using a first PUCCH format in a case that the first information is transmitted, a PDCCH used for scheduling of a PDSCH transmission only on a primary cell is transmitted in a CSS on the primary cell, and a counter DAI value included in the downlink assignment is set to 1, receives the HARQ-ACK by using the first PUCCH format in a case that the first information is transmitted, the PDCCH used for scheduling of the PDSCH transmission only on the primary cell is transmitted in a USS on the primary cell, and both the counter DAI value and a total DAI value included in the downlink assignment are set to 1, and receives the HARQ-ACK by using one of a third PUCCH format and a fourth PUCCH format in a case that the first information is transmitted, the PDCCH used for scheduling of the PDSCH transmission only on the primary cell is transmitted, and either the counter DAI value or the total DAI value included in the downlink assignment is set to a value greater than 1.

(3) A communication method of a terminal apparatus according to an aspect of the present invention includes the steps of: receiving higher layer signaling including first information for configuring that the number of bits of HARQ-ACK is determined based on downlink assignment; receiving the downlink assignment on a PDCCH; and transmitting the HARQ-ACK, wherein the HARQ-ACK is transmitted by using a first PUCCH format in a case that the first information is received, a PDCCH used for scheduling of a PDSCH transmission only on a primary cell is detected in a CSS on the primary cell, and a counter DAI value included in the downlink assignment is set to 1, the HARQ-ACK is transmitted by using the first PUCCH format in a case that the first information is received, the PDCCH used for scheduling of the PDSCH transmission only on the primary cell is detected in a USS on the primary cell, and both the counter DAI value and a total DAI value included in the downlink assignment are set to 1, and the HARQ-ACK is transmitted by using one of a third PUCCH format and a fourth PUCCH format in a case that the first information is received, the PDCCH used for scheduling of the PDSCH transmission only on the primary cell is detected, and either the counter DAI value or the total DAI value included in the downlink assignment is set to a value greater than 1.

(4) A communication method of a base station apparatus according to an aspect of the present invention includes the steps of: transmitting higher layer signaling including first information for configuring that the number of bits of HARQ-ACK is determined based on downlink assignment; transmitting the downlink assignment on a PDCCH; and receiving the HARQ-ACK, wherein the reception unit the HARQ-ACK is received by using a first PUCCH format in a case that the first information is transmitted, a PDCCH used for scheduling of a PDSCH transmission only on a primary cell is transmitted in a CSS on the primary cell, and a counter DAI value included in the downlink assignment is set to 1, the HARQ-ACK is received by using the first PUCCH format in a case that the first information is transmitted, the PDCCH used for scheduling of the PDSCH transmission only on the primary cell is transmitted in a USS on the primary cell, and both the counter DAI value and a total DAI value included in the downlink assignment are set to 1, and the HARQ-ACK is received by using one of a third PUCCH format and a fourth PUCCH format in a case that the first information is transmitted, the PDCCH used for scheduling of the PDSCH transmission only on the primary cell is transmitted, and either the counter DAI value or the total DAI value included in the downlink assignment is set to a value greater than 1.

(5) An integrated circuit to be mounted on a terminal apparatus according to an aspect of the present invention, causes the terminal apparatus to exert: a reception function of receiving higher layer signaling including first information for configuring that the number of bits of HARQ-ACK is determined based on downlink assignment, and receiving the downlink assignment on a PDCCH; and a transmission function of transmitting the HARQ-ACK, wherein the HARQ-ACK is transmitted by using a first PUCCH format in a case that the first information is received, a PDCCH used for scheduling of a PDSCH transmission only on a primary cell is detected in a CSS on the primary cell, and a counter DAI value included in the downlink assignment is set to 1, the HARQ-ACK is transmitted by using the first PUCCH format in a case that the first information is received, the PDCCH used for scheduling of the PDSCH transmission only on the primary cell is detected in a USS on the primary cell, and both the counter DAI value and a total DAI value included in the downlink assignment are set to 1, and the HARQ-ACK is transmitted by using one of a third PUCCH format and a fourth PUCCH format in a case that the first information is received, the PDCCH used for scheduling of the PDSCH transmission only on the primary cell is detected, and either the counter DAI value or the total DAI value included in the downlink assignment is set to a value greater than 1.

(6) An integrated circuit to be mounted on a base station apparatus according to an aspect of the present invention, causes the base station apparatus to exert: a transmission function of transmitting higher layer signaling including first information for configuring that the number of bits of HARQ-ACK is determined based on downlink assignment, and transmitting the downlink assignment on a PDCCH; and a reception function of receiving the HARQ-ACK, wherein the HARQ-ACK is received by using a first PUCCH format in a case that the first information is transmitted, a PDCCH used for scheduling of a PDSCH transmission only on a primary cell is transmitted in a CSS on the primary cell, and a counter DAI value included in the downlink assignment is set to 1, the HARQ-ACK is received by using the first PUCCH format in a case that the first information is transmitted, the PDCCH used for scheduling of the PDSCH transmission only on the primary cell is transmitted in a USS on the primary cell, and both the counter DAI value and a total DAI value included in the downlink assignment are set to 1, and the HARQ-ACK is received by using one of a third PUCCH format and a fourth PUCCH format in a case that the first information is transmitted, the PDCCH used for scheduling of the PDSCH transmission only on the primary cell is transmitted, and either the counter DAI value or the total DAI value included in the downlink assignment is set to a value greater than 1.

Advantageous Effects of Invention

According to the present invention, uplink control information can be transmitted efficiently.

BRIEF DESCRIPTION OF DRAWINGS

FIG. 3 is a diagram illustrating a DCI format for downlink according to the present embodiment.

FIG. 4 is a diagram illustrating the number of bits of a DAI according to the present embodiment.

FIGS. 5A to 5C are diagrams illustrating a PUCCH cell group according to the present embodiment.

FIG. 7 is another diagram illustrating the method of transmitting uplink control information according to the present embodiment.

FIG. 8 is another diagram illustrating the method of transmitting uplink control information according to the present embodiment.

FIG. 9 is another diagram illustrating the method of transmitting uplink control information according to the present embodiment.

DESCRIPTION OF EMBODIMENTS

Embodiments of the present invention will be described below.

Figure 1:
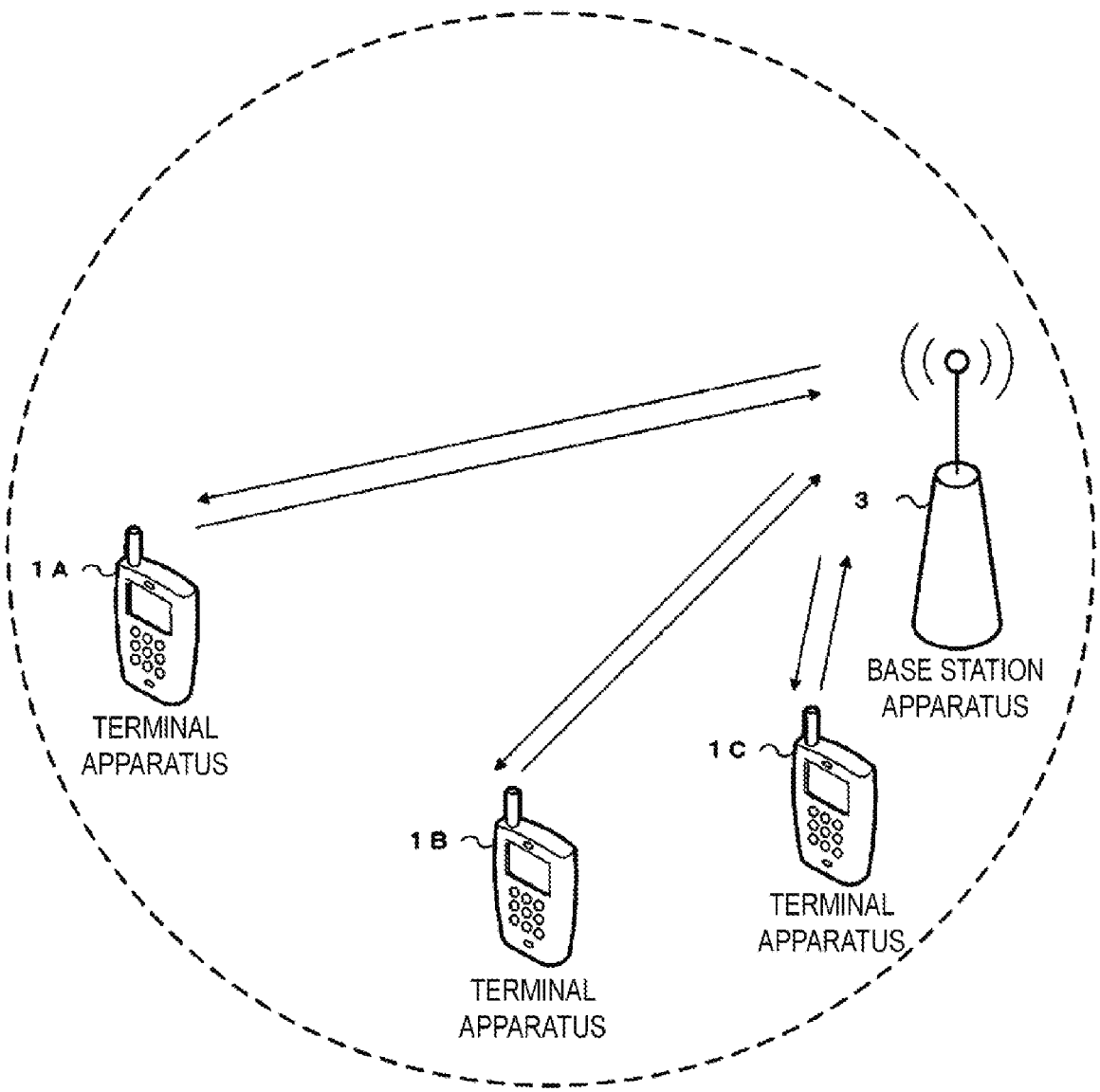
FIG. 1 is a diagram illustrating a concept of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. Hereinafter, the terminal apparatuses 1A to 1C are each also referred to as a terminal apparatus 1.

Physical channels and physical signals according to the present embodiment will be described.

In FIG. 1, the following uplink physical channels are used for uplink radio communication from the terminal apparatus 1 to the base station apparatus 3. Here, the uplink physical channels are used to transmit information output from the higher layers.

Physical Uplink Control Channel (PUCCH)
Physical Uplink Shared Channel (PUSCH)
Physical Random Access Channel (PRACH)

The PUCCH is used for transmission of Uplink Control Information (UCI). Here, the uplink control information may include Channel State Information (CSI) used to indicate a downlink channel state. The uplink control information may include Scheduling Request (SR) used to request an UL-SCH resource. The uplink control information may include Hybrid Automatic Repeat request ACKnowledgment (HARQ-ACK).

Here, HARQ-ACK may indicate HARQ-ACK for downlink data (Transport block, Medium Access Control Protocol Data Unit (MAC PDU), Downlink-Shared Channel (DL-SCH), or Physical Downlink Shared Channel (PDSCH)). In other words, HARQ-ACK may indicate a positive-acknowledgment (ACK) or a negative-acknowledgment (NACK). Here, HARQ-ACK may also be referred to as ACK/NACK, HARQ feedback, HARQ acknowledgment, HARQ information, or HARQ control information.

The PUSCH is used for transmission of uplink data (Uplink-Shared Channel (UL-SCH)). Furthermore, the PUSCH may be used to transmit HARQ-ACK and/or CSI along with the uplink data. Furthermore, the PUSCH may be used to transmit CSI only or HARQ-ACK and CSI only. In other words, the PUSCH may be used to transmit the uplink control information only.

Here, the base station apparatus 3 and the terminal apparatus 1 exchange (transmit and/or receive) signals with each other in their respective higher layers. For example, the base station apparatus 3 and the terminal apparatus 1 may transmit and/or receive, in a Radio Resource Control (RRC) layer, RRC signaling (also referred to as a Radio Resource Control message (RRC message) or Radio Resource Control information (RRC information)). The base station apparatus 3 and the terminal apparatus 1 may transmit and/or receive a Medium Access Control (MAC) control element in a MAC layer. Here, the RRC signaling and/or the MAC control element is also referred to as higher layer signaling.

The PUSCH may be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, user-equipment-specific information (information unique to user equipment) may be transmitted through signaling dedicated to the certain terminal apparatus 1.

The PRACH is used to transmit a random access preamble. The PRACH may be used for an initial connection establishment procedure, a handover procedure, a connection re-establishment procedure, uplink transmission synchronization (timing adjustment), and indicating a PUSCH resource request.

In FIG. 1, the following uplink physical signal is used in the uplink radio communication. Here, the uplink physical signal is not used to transmit information output from the higher layers but is used by the physical layer.

Uplink Reference Signal (UL RS)

In the present embodiment, the following two types of uplink reference signals are used.

Demodulation Reference Signal (DMRS)
Sounding Reference Signal (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PDSCH, Transmission of both of the PUCCH and the DMRS is hereinafter referred to simply as transmission of the PUCCH.

The SRS is not associated with the transmission of the PUSCH or the PUCCH. The base station apparatus 3 uses the SRS in order to measure an uplink channel state.

In FIG. 1, the following downlink physical channels are used for downlink radio communication from the base station apparatus 3 to the terminal apparatus 1. Here, the downlink physical channels are used to transmit the information output from the higher layers.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB, Broadcast Channel (BCH)), that is shared by the terminal apparatuses 1.

The PCFICH is used for transmission of information indicating a region (OFDM symbols) to be used for transmission of the PDCCH.

The PHICH is used for transmission of a HARQ indicator (HARQ feedback or response information) indicating an ACKnowledgement (ACK) or a Negative ACKnowledgement (NACK) for the uplink data (Uplink Shared Channel (UL-SCH)) received by the base station apparatus 3.

The PDCCH and the EPDCCH are used for transmission of Downlink Control Information (DCI). Here, multiple DCI formats are defined for transmission of the downlink control information. In other words, a field for the downlink control information is defined in a DCI format and is mapped to information bits.

The PDSCH is used for transmission of downlink data (Downlink Shared Channel (DL-SCH)). The PDSCH is used to transmit a system information message. Here, the system information message may be cell-specific information (information unique to a cell). The system information is included in RRC signaling. The PDSCH is used to transmit the RRC signaling and the MAC control element.

The PMCH is used for transmission of multicast data (Multicast Channel (MCH)).

In FIG. 1, the following downlink physical signals are used for downlink radio communication. Here, the downlink physical signals are not used to transmit the information output from the higher layers but is used by the physical layer.

Synchronization signal (SS)
Downlink Reference Signal (DL RS)

The Synchronization signal is used in order for the terminal apparatus 1 to be synchronized to frequency and time domains in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The Downlink Reference Signal is used in order for the terminal apparatus 1 to perform channel compensation on a downlink physical channel. The downlink reference signal is used in order for the terminal apparatus 1 to obtain the downlink channel state information.

According to the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Chanel State Information-Reference Signal (NZP CSI-RS)
Zero Power Chanel State Information-Reference Signal (ZP CSI-RS)
Multimedia Broadcast and Multicast Service over Single Frequency Network Reference signal (MBSFN RS)
Positioning Reference Signal (PRS)

Here, the downlink physical channel and the downlink physical signal are collectively referred to as a downlink signal. The uplink physical channel and the uplink physical signal are collectively referred to as an uplink signal. The downlink physical channels and the uplink physical channels are collectively referred to as a physical channel. The downlink physical signals and the uplink physical signals are collectively referred to as physical signals.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and subjected to coding processing on a codeword-by-codeword basis.

Now, carrier aggregation will be described.

In the present embodiment, one or multiple serving cells may be configured for the terminal apparatus 1. A technology in which the terminal apparatus 1 communicates via the multiple serving cells is referred to as cell aggregation or carrier aggregation.

Here, the present embodiment may apply to one or each of the multiple serving cells configured for the terminal apparatus 1. Alternatively, the present embodiment may apply to one or some of the multiple serving cells configured for the terminal apparatus 1. Alternatively, the present embodiment may apply to one or each of the multiple serving cell groups (for example, PUCCH cell groups) configured for the terminal apparatus 1, which will be described later. Alternatively, the present embodiment may apply to one or some of the multiple serving cell groups configured for the terminal apparatus 1.

In the present embodiment, Time Division Duplex (TDD) and; or Frequency Division Duplex (FDD) may be applied. Here, for the carrier aggregation, TDD or FDD may apply to one or all of the multiple serving cells. Alternatively, for the carrier aggregation, serving cells to which TDD applies and serving cells to which FDD applies may be aggregated. Here, a frame structure for FDD is also referred to as Frame structure type 1. A frame structure for TDD is also referred to as Frame structure type 2.

Here, the configured one or multiple serving cells include one primary cell and one or multiple secondary cells. The primary cell may be a serving cell on which an initial connection establishment procedure has been performed, a serving cell in which a connection re-establishment procedure has been started, or a cell indicated as a primary cell during a handover procedure. Here, upon an RRC connection being established or later, a secondary cell(s) may be configured.

Here, a carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 may simultaneously perform transmission and/or reception on multiple physical channels in one or multiple serving cells (component carrier(s)). Here, transmission of one physical channel may be performed in one serving cell (component carrier) of the multiple serving cells (component carriers).

Here, the primary cell is used for transmission of PUCCH. The secondary cell configured, by the base station apparatus 3, with the PUCCH may be used to transmit the PUCCH. Here, the secondary cell used to transmit the PUCCH is also referred to as a PUCCH secondary cell. A secondary cell not used to transmit the PUCCH is also referred to as a non-PUCCH secondary cell. The primary cell and the PUCCH secondary cell are collectively referred to also as a PUCCH serving cell and a PUCCH cell. In other words, the terminal apparatus 1 performs PUCCH transmission on the PUCCH serving cell.

A configuration of a slot according to the present embodiment will be described below.

Figure 2:
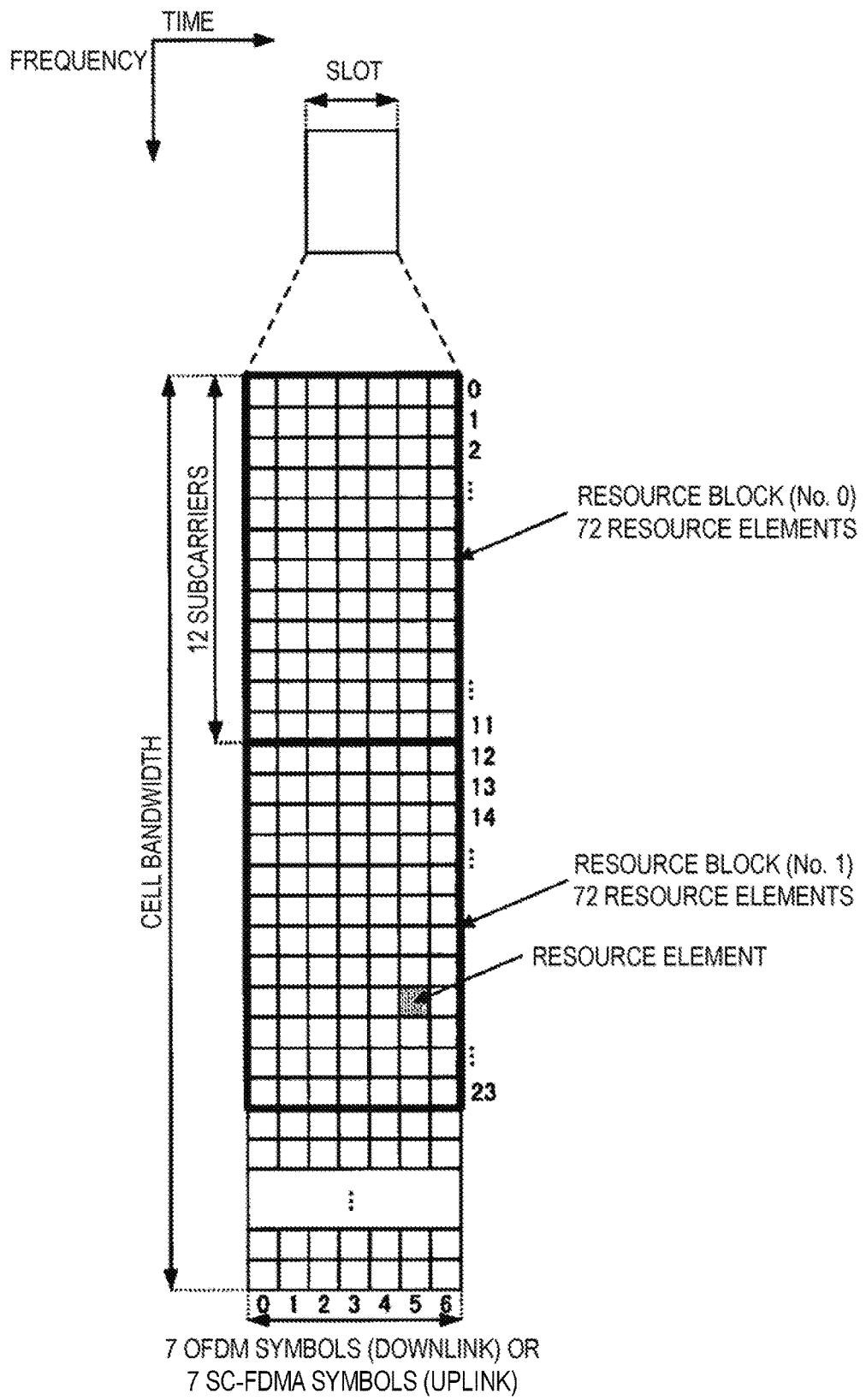
FIG. 2 is a diagram illustrating a configuration of a slot according to the present embodiment.

FIG. 2 is a diagram illustrating the configuration of the slot according to the present embodiment. In FIG. 2, a horizontal axis represents a time axis, and a vertical axis represents a frequency axis. Here, a normal Cyclic Prefix (CP) may apply to an OFDM symbol. Alternatively, an extended Cyclic Prefix (CP) may apply to the OFDM symbol. The physical signal or physical channel transmitted in each of the slots is expressed by a resource grid.

Here, in the downlink, the resource grid may be defined with multiple subcarriers and multiple OFDM symbols. In the uplink, the resource grid may be defined with multiple subcarriers and multiple SC-FDMA symbols. The number of subcarriers constituting one slot may depend on a cell bandwidth. The number of OFDM symbols or SC-FDMA symbols constituting one slot may be seven. Here, each element within the resource grid is referred to as a resource element. The resource element may be identified by a subcarrier number and an OFDM symbol or SC-FDMA symbol number.

Here, a resource block may be used to express mapping of a certain physical channel (PDSCH, PUCCH, or the like) to resource elements. For the resource block, a virtual resource block and a physical resource block may be defined. A certain physical channel may be first mapped to the virtual resource block. Thereafter, the virtual resource block may be mapped to the physical resource block. One physical resource block may be defined with seven consecutive OFDM symbols or SC-FDMA symbols in the time domain and 12 consecutive subcarriers in the frequency domain. Thus, one physical resource block may include (7×12) resource elements. Furthermore, one physical resource block may correspond to one slot in the time domain and correspond to 180 kHz in the frequency domain. The physical resource blocks may be numbered from zero in the frequency domain.

Here, as described above, multiple DCI formats may be defined for transmission of the downlink control information that is transmitted on PDSCH and EPDCCH. In other words, a field for the downlink control information is defined in a DCI format and is mapped to information bits.

For example, DCI formats for downlink (e.g., DCI format 1, DCI format 1A, DCI format 1C) to be used for the scheduling of one PDSCH in one cell (transmission of a single downlink transport block) may be defined.

FIG. 3 is a diagram illustrating the DCI format for the downlink. For example, the DCI format for the downlink may include downlink control information such as a Carrier Indicator Field (CIF), information for identifying resource allocation type (Resource allocation header), information of Resource block assignment, information of Modulation and Coding Scheme (MCS), information of HARQ process number, information indicating whether the data is new data (New Data indicator), information of a Redundancy version, information of a transmission power control for transmission on PUCCH (Transmission Power Control command for PUCCH), and information of a Downlink Assignment Index (DAI).

Here, the downlink DCI format is also referred to as downlink grant or downlink assignment. That is, the downlink DCI format pray include information of the scheduling of the PDSCH.

For example, DCC formats for the uplink (e.g., DCI format 0 and DCI format 4) to be used for the scheduling of one PUSCH in one cell (transmission of a single uplink transport block) may be defined.

For example, the uplink DCI format may include the Downlink Control Information such as a Carrier Indicator Field (CIF), information about Resource block assignment and/or hopping resource allocation, information about Modulation and coding scheme (MCS) and/or redundancy version, or information used for indicating the number of transmission layers (Precoding, information and the number of layers).

Here, the uplink DCI format is also referred to as uplink grant or Uplink assignment. That is, the uplink DCI format may include information of the scheduling of the PUSCH.

In a case that a PDSCH resource is scheduled in accordance with the downlink assignment, the terminal apparatus 1 may receive downlink data on the scheduled PDSCH. In a case that a PDSCH resource is scheduled in accordance with the uplink grant, the terminal apparatus 1 may transmit uplink data and/or uplink control information on the scheduled PUSCH.

Here, the terminal apparatus 1 may monitor a set of PDCCH candidates and/or EPDCCH candidates. The PDCCH may include an EPDCCH below. Here, the PDCCH candidates are candidates which the PDCCH may be mapped to and/or transmitted on by the base station apparatus 3. Furthermore "monitor" may imply that the terminal apparatus 1 attempts to decode each PDCCH in the set of PDCCH candidates in accordance with each of all the monitored DCI formats.

The set of PDCCH candidates to be monitored by the terminal apparatus 1 is also referred to as a search space. The search space may include a Common Search Space (CSS). For example, the CSS may be defined as a space common to multiple terminal apparatuses 1. The search space may include a UE-specific Search Space (USS). For example, the USS may be given by at least based on a C-RNTI assigned to the terminal apparatus 1. The terminal apparatus 1 may monitor the PDCCHs in the CSS and/or USS to detect a PDCCH destined for the terminal apparatus 1 itself.

In addition, an RNTI assigned to the terminal apparatus 1 by the base station apparatus 3 is used for the transmission of the downlink control information (transmission on the PDCCH). Specifically, Cyclic Redundancy check (CRC) parity bits are attached to the DCI format (or downlink control information), and after the attachment, the CRC parity bits are scrambled by the RNTI. Here, the CRC parity bits attached to the DCI format may be obtained from a payload of the DCI format.

In other words, the terminal apparatus 1 attempts to decode the DCI format to which the CRC parity bits scrambled by the RNTI are attached, and detects, as a DCI format destined for the terminal apparatus 1 itself, the DCI format for which the CRC has been successful (also referred to as blind coding). In other words, the terminal apparatus 1 may detect the PDCCH with the CRC scrambled by the RNTI. The terminal apparatus 1 may detect the PDCCH including the DCI format to which the CRC parity bits scrambled by the RNTI are attached.

Here, the RNTI may include a Cell-Radio Network Temporary Identifier (C-RNTI). The C-RNTI is an identifier unique to the terminal apparatus 1 and used for the identification in RRC connection and scheduling. The C-RNTI may be used for dynamically scheduled unicast transmission.

The RNTI may further include a Semi-Persistent Scheduling C-RNTI (SPS C-RNTI). The SPS C-RNTI is an identifier unique to the terminal apparatus 1 and used for semi-persistent scheduling. The SPS C-RNTI may be used for semi-persistently scheduled unicast transmission.

FIG. 4 is a diagram illustrating the number of bits of a downlink assignment index (DAI). For example, the number of bits of the DAI may be 4 bits in a case that information of higher layers (codebooksizeDetermination-r13; hereafter also referred to as first information) is configured (set) to "0 (or, dai)", and the DCI format scheduling the PDSCH (that is, the DCI format for the downlink) is mapped onto the USS. Here, in this case, the 4-bit DAI may consist of a 2-bit counter DAI and a 2-bit total DAI. Here, the 4-bit DAI (the 4-bit DAI field) may be used (or present) for FDD, and/or TDD. In addition, as described above, the USS may be given at least by a C-RNTI.

The number of bits of the DAI may be 2 bits in a case that less than five (or five or less) downlink cells are configured. The number of bits of DAI may be 2 bits in a case that the first information is configured (set) to "1 (or, cc)". The number of bits of the DAI may be 2 bits in a case that the first information is configured (set) to "0 (or, dai)", and the DCI format scheduling the PDSCH (that is, the DCI format for the downlink) is not mapped onto the USS. In other words, the number of bits of the DAI may be 2 bits in a case that the first information is configured (set) to "0 (or, dai)" and the DCI format scheduling the PDSCH (that is, the DCI format for the downlink) is mapped onto the CSS. Here, the 2-bit DAI may be configured as a 2-bit counter DAI.

Here, the 2-bit DAI (2-bit DAI field) may be used (present) for TDD. The 2-bit DAI may be used in a case that the TDD is applied to the primary cell in carrier aggregation in which TDD and FDD are applied to cells.

In other words, the 2-bit DAI (or, DAI field) may not be used (present) in a case that FDD is applied, and/or in a case that FDD is applied to the primary cell in carrier aggregation in which TDD and FDD are applied to cells. In other words, in the case that less than five (or five or less) downlink cells are configured, the number of bits of the DAI may be 0 bit. In a case that the first information is configured (set) to "1 (or, cc)", the number of bits of the DAI may be 0 bit. In a case that first information is configured (set) to "0 (or, dai)", and the DCI format scheduling the PDSCH (that is, the DCI format for the downlink) is not mapped onto the USS, the number of bits of the DAI may be 0 bit. In other words, in a case that the first information is configured (set) to "0 (or, dai)", and the DCI format scheduling the PDSCH (that is, the DCI format for the downlink) is mapped onto the CSS, the number of bits of the DAI may be 0 hit.

In other words, the base station apparatus 3 may transmit higher layer signaling including the first information (codebooksizeDetermination-r13) configured (set) to "0 (or, dai)" or "1 (or, cc)". For example, the base station apparatus 3 may transmit signaling in the RRC layer including the first information.

For example, the terminal apparatus 1 in which the value of the first information is configured (set) to "0" may determine the number of the bits of the HARQ-ACK (or, the number of the bits of the HARQ-ACK and the bits of the scheduling request), based on at least the value of the DAI, In other words, in this case, the HARQ-ACK feedback that consists of the HARQ-ACK bits for the serving cell may be based on at least the DAI (the HARQ-ACK feedback consists of the HARQ-ACK bits for the serving cells based on at least DAI).

For example, in a case that the value of the first information is configured (set) to "0" for FDD (for frame structure type 1 in a case that FDD is applied), the number of the bits of the HARQ-ACK may be determined based on at least the value of the DAI. In a case that the value of the first information is configured (set) to "0" for TDD (for frame structure type 2 in a case that TDD is applied), the number of the bits of the HARQ-ACK may be determined based on at least the value of the DAI.

Here, in a case that a single codeword transmission mode (a transmission mode that supports single transport block) is configured as the downlink transmission mode, a 1-bit HARQ-ACK may be used for the cell. In a case that a transmission mode of up to two codewords (a transmission mode that supports two or smaller transport blocks) is configured as the downlink transmission mode, a 2-bit HARQ-ACK may be used for the cell.

Here, for FDD and one subframe n, the counter DAI value may denote the accumulative number of the serving cell(s) with transmission(s) on the PDSCH associated with the PDCCH(s) (for FDD and a subframe n, the value of the counter DAI denotes the accumulative number of serving cell(s) with PDSCH transmission(s) associated with PDCCH(s)). Here, the counter DAI value may include the accumulative number of the serving cell with the PDCCH indicating downlink SPS release (the value of the counter DAI denotes the accumulative number of serving cell with PDCCH indicating SPS release). In other words, the counter DAI value may denote the accumulative number of the serving cell with transmission on the PDSCH associated with the PDCCH, and/or the serving cell with the PDCCH indicating downlink SPS release.

For TDD, the counter DAI value may denote the accumulative number of {serving cell(s), and/or subframe(s)}-pair(s) with transmission(s) on the PDSCH associated with the PDCCH(s) (for TDD, the value of the counter DAI denotes the accumulative number of {serving cell(s), and/or subframe(s)}-pair(s) with PDSCH transmission(s) associated with PDCCH(s)). Here, the counter DAI value may include the accumulative number of {serving cell(s), and/or subframe(s)}-pair(s) with the PDCCH indicating downlink SPS release (the value of the counter DAI denotes the accumulative number of {serving cell(s), and/or subframe(s)}-pair(s) with PDCCH indicating SPS release). In other words, the counter DAI value may denote the accumulative number of {serving cell(s), and/or subframe(s)}-pair(s) with transmission on the PDSCH associated with the PDCCH, and/or {serving cell(s), and/or subframe(s)}-pair(s) with the PDCCH indicating downlink SPS release.

The terminal apparatus 1 in which "1" is configured (set) as the value of the first information may set the number of the bits of the HARQ-ACK, based on at least the number of the configured serving cell. In other words, in this case, the HARQ-ACK feedback may consist of the concatenation of the HARQ-ACK bits for each of the serving cells (the HARQ-ACK feedback consists of the concatenation of HARQ-ACK bits for each of the serving cells). Here, for example, the base station apparatus 3 may configure the serving cell (secondary cell) by using higher layer signaling. In other words, in a case that two secondary cells are configured by the base station apparatus 3, the number of the configured serving cells may be three (one primary cell and two secondary cells).

For example, in a case that "1" is configured (set) as the value of the first information for FDD, the number of the bits of the HARQ-ACK may be determined based on at least the number of the configured serving cells, and the downlink transmission mode configured in each cell. In a case that "1" is configured (set) as the value of the first information for TDD, the number of the bits of the HARQ-ACK may be determined based on at least the number of the configured serving cells, the downlink transmission mode configured in each cell, and the number of the downlink subframes associated with an uplink subframe for transmission of the HARQ-ACK.

Here, determination of the number of the bits of the HARQ-ACK is also referred to as HARQ-ACK codebook size determination (or HARQ-ACK codebook determination). In addition, a HARQ-ACK procedure of the case that the value of the first information is configured (set) to "0" is also referred to as HARQ-ACK procedure with adaptive codebook. A HARQ-ACK procedure of the case that "1" is configured (set) as the value of the first information is also referred to as HARQ-ACK procedure without adaptive codebook.

In other words, in a case that the value of the first information is configured (set) to "0", the terminal apparatus 1 may perform the HARQ-ACK procedure with adaptive codebook. In a case that "1" is configured (set) as the value of the first information, the terminal apparatus 1 may perform the HARQ-ACK procedure without adaptive codebook.

FIGS. 5A to 5C are diagrams illustrating the PUCCH cell group according to the present embodiment.

FIGS. 5A to 5C illustrate three examples (Example (a), Example (b), and Example (c)) as examples of a configuration (constitution or definition) of a PUCCH cell group. Here, a group of a plurality of serving cells may be referred to as a PUCCH cell group. The PUCCH cell group may be a group associated with transmission on the PUCCH (transmission of uplink control information on PUCCH). A serving cell may belong to any one of PUCCH cell groups. For example, the base station apparatus 3 may transmit higher layer signaling (signaling in the RRC layer) that includes information used to configure the PUCCH cell group.

FIG. 5A illustrates a configuration where a first PUCCH cell group and a second cell group are configured as the PUCCH cell groups. For example, in FIG. 5A, the base station apparatus 3 may transmit a downlink signal in the first cell group, and the terminal apparatus 3 may transmit an uplink signal in the first cell group (in other words, may transmit uplink control information on the PUCCH in the first cell group). For example, the terminal apparatus 1 may transmit uplink control information for the downlink component carrier in the first cell group on PUCCH in the primary cell in the first cell group.

Similarly, the base station apparatus 3 and the terminal apparatus 1 may configure a PUCCH cell group as illustrated in FIG. 5B, and transmit and/or receive uplink control information to and from each other. Further, the base station apparatus 3 and terminal apparatus 1 may configure the PUCCH cell group as illustrated in FIG. 5C and transmit and/or receive the uplink control information on the PUCCH cell group.

Figure 6:
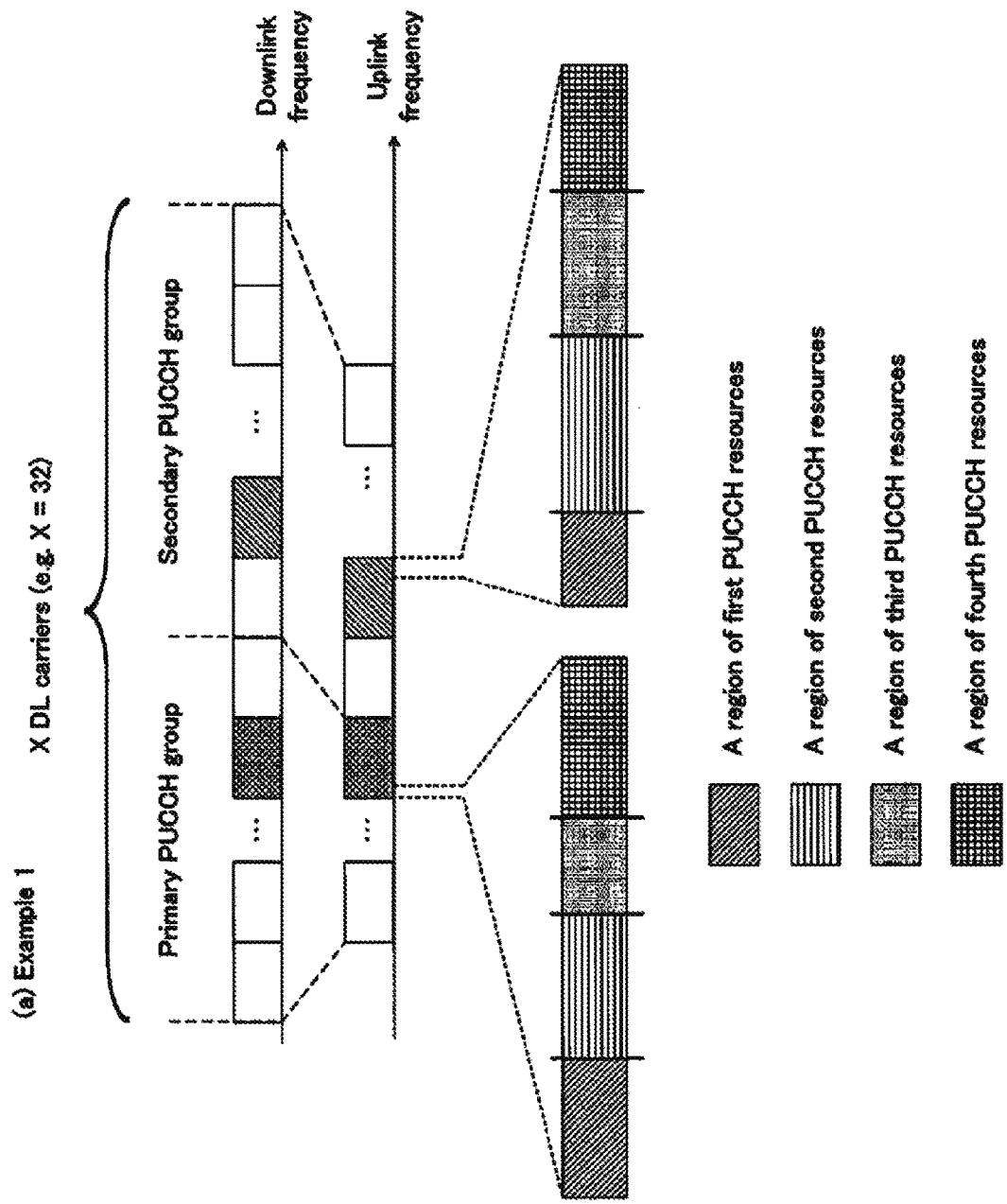
FIG. 6 is a diagram illustrating a method of transmitting uplink control information according to the present embodiment.

FIG. 6 is a diagram illustrating a method of transmitting uplink control information according to the present embodiment.

Here, the PUCCH cell group including the primary cell may be referred to as a primary PUCCH group. In addition, the PUCCH cell group including the PUCCH secondary cell may be referred to as a secondary PUCCH group. Here, the terminal apparatus 1 configured with the PUCCH secondary cell may perform transmission of uplink control information on the PUCCH by the primary PUCCH group and the secondary PUCCH group.

Here, in the terminal apparatus 1, in a case that transmission of uplink control information is performed in the primary PUCCH group, the primary cell and the secondary cell may belong to the primary PUCCH group. In the terminal apparatus 1, in a case that transmission of uplink control information is performed in the secondary PUCCH group, the PUCCH secondary cell and the secondary cell may belong to the secondary PUCCH group. In the following description, the PUCCH secondary cell(s) of the secondary PUCCH group is also referred to as a primary cell for convenience of description.

Here, multiple formats may be defined (supported) for PUCCH. Each format supported for PUCCH (the format that PUCCH supports) is also referred to as a PUCCH format. For example, the use of the following PUCCH formats allows combinations of pieces of Uplink Control Information of PUCCH (transmission of combinations of pieces of Uplink Control Information) to be supported.

Format 1a
Format 1b
Format 2
Format 2a
Format 2b
Format 3
Format 4

Here, PUCCH format 1a may be defined for 1-bit HARQ-ACK or 1-bit HARQ-ACK with positive SR. PUCCH format 1b may be defined for 2-bit HARQ-ACK or 2-bit HARQ-ACK with positive SR. In the following description, PUCCH format 1a, and/or PUCCH format 1b is also referred to as a first PUCCH format.

PUCCH format 2 may be defined for a CSI report of the case that HARQ-ACK is not multiplexed. PUCCH format 2a may be defined for a CSI report where 1-bit HARQ-ACK is multiplexed. PUCCH format 2b may be defined for a CSI report where 2-bit HARQ-ACK is multiplexed. In the following description, PUCCH format 2, PUCCH format 2a, and/or PUCCH format 2b is also referred to as a second PUCCH format.

PUCCH format 3 may be defined for up to 10-bit HARQ-ACK. PUCCH format 3 may be defined for up to 11-bit corresponding to a 10-bit HARQ and a 1-bit positive/negative SR. In other words, 1-bit information may indicate whether it is positive SR or negative SR. Here, up to 10-bit HARQ-ACK and up to 11-bit corresponding to 10-bit HARQ-ACK and 1-bit positive/negative SR may be defined for FDD.

PUCCH format 3 may be defined for up to 20-bit HARQ-ACK. PUCCH format 3 may be defined for up to 21-bit corresponding to 20-bit HARQ-ACK and a 1-bit positive/negative SR. Here, up to 20-bit HARQ-ACK and up to 21-bit corresponding to 20-bit HARQ-ACK and 1-bit positive/negative SR may be defined for TDD.

Here, in a case that Uplink Control Information (HARQ-ACK, SR, and/or CSI) is transmitted using PUCCH format 3, a first coding method (e.g., Reed Muller code (Reed Muller coding) or (32, O) block code ((32, O) block coding)) may be used. For example, Basic sequences for (32, O) block code may be given in advance by a specification or the like.

PUCCH format 3 may be defined for HARQ-ACK and a CSI report for one serving cell. PUCCH format 3 may be defined for HARQ-ACK, 1-bit positive/negative SR, and a CSI report for one serving cell. In the following description, PUCCH format 3 is also referred to as a third PUCCH format.

PUCCH format 4 may be defined for more than 22-bit uplink control information (HARQ-ACK, scheduling request, and/or periodic CSI). Here, the periodic CSI may be a CSI for one serving cell. The periodic CSI may be CSI for multiple serving cells. SR may be positive SR and/or negative SR. In the following description, PUCCH format 4 is also referred to as a fourth PUCCH format.

Herein, in a case that the uplink control information (HARQ-ACK, SR, and/or CSI) is transmitted using PUCCH format 4, a second coding method (e.g., Tail biting convolutional encoder (Tail biting convolutional coding) or Turbo encoder (Turbo coding)) may be used.

That is, the number of bits per subframe transmitted (transmittable) using PUCCH format 4 may be greater than the Number of bits per subframe transmitted (transmittable) using PUCCH format 3. More particularly, the amount of information per subframe transmitted (transmittable) using PUCCH format 4 may be larger than the amount of information transmitted (transmittable) per subframe using PUCCH format 3.

Here, the base station apparatus 3 may indicate (configure or allocate) a PUCCH resource. Here, the PUCCH resource may include a first PUCCH resource (also referred to as PUCCH resource 1), a second PUCCH resource (also referred to as PUCCH resource 2), a third PUCCH resource (also referred to as PUCCH resource 3), and/or a fourth PUCCH resource (also referred to as PUCCH resource 4).

For example, the base station apparatus 3 may indicate the first PUCCH resource by using higher layer signaling and the PDCCH, For example, the base station apparatus 3 may transmit higher layer signaling including second information to be used to configure the first PUCCH resource. For example, HARQ-ACK for the first PUCCH format may be transmitted with the first PUCCH resource. The terminal apparatus 1 may determine the first PUCCH resource, based on the Control Channel Element (CCE) used for the transmission of PDCCH (for example, the lowest index of CCE) and the second information. The terminal apparatus 1 may use the first PUCCH resource for the transmission of HARQ-ACK for the first PUCCH format. To be more specific, the terminal apparatus 1 may transmit HARQ-ACK by using the first PUCCH resource and the first PUCCH format.

The base station apparatus 3 may transmit higher layer signaling including third information to be used to configure the second PUCCH resource. For example, CSI (for example, periodic CST) may be transmitted with the second PUCCH resource. Here, the second PUCCH resource may be configured for each of the serving cells. In other words, periodic CSI for each serving cell may be reported. The base station apparatus 3 may transmit higher layer signaling including fourth information to be used to indicate periodicity and/or offset for a periodic CSI report. The terminal apparatus 1 may periodically report CSI in accordance with a configuration made by the base station apparatus 3. To be more specific, the terminal apparatus 1 may report periodic CSI with the second PUCCH resource and the second PUCCH format.

The base station apparatus 3 may indicate the third PUCCH resource through higher layer signaling and the PDCCH (or Downlink Control Information transmitted on the PDCCH). For example, the base station apparatus 3 may transmit fifth information for configuring four values associated with the third PUCCH resource (four third PUCCH resources) by using higher layer signaling and further indicate one of the third PUCCH resources, based on the value set in the downlink control information transmitted on the PDCCH for the secondary cell (for example, by indicating one of the four configured values by using "00", "01", "10", or "11" set in the 2-bit information field).

For example, the base station apparatus 3 may indicate one of the third PUCCH resources by using the value set in the transmission power command field for the PUCCH included in a downlink assignment transmitted on the PDCCH for the secondary cell. For example, HARQ-ACID, SR, and/or periodic CSI for the third PUCCH format may be transmitted by the third PUCCH resource. The terminal apparatus 1 may transmit HARQ-ACK, SR, and/or periodic CSI with the third PUCCH resource and the third PUCCH format.

The base station apparatus 3 may indicate the fourth PUCCH resource through higher layer signaling and the PDCCH (or Downlink Control Information transmitted on the PDCCH). For example, the base station apparatus 3 may transmit fifth information for configuring four values associated with the fourth PUCCH resource (four third PUCCH resources) by using higher layer signaling and further indicate one of the third PUCCH resources, based on the value set in the downlink control information transmitted on the PDCCH for the secondary cell (for example, by indicating one of the four configured values by using "00", "01" "10", or "11" set in the 2-bit information field).

For example, the base station apparatus 3 may indicate one of the fourth PUCCH resources by using the value set in the transmission power command field for the PUCCH included in a downlink assignment transmitted on the PDCCH for the secondary cell. For example, HARQ-ACK, SR, and/or periodic CSI for the fourth PUCCH format may be transmitted by the fourth PUCCH resource. The terminal apparatus 1 may transmit HARQ-ACK, SR, and/or periodic CSI with the fourth PUCCH resource and the fourth PUCCH format.

Hereinafter, a subframe in which detection of a PDCCH and transmission (decoding) on a PDSCH based on the detection of the PDCCH are performed, is also referred to as a first subframe. For example, the first subframe is represented as subframe n-4. Here, the first subframe may indicate single or multiple subframes for the HARQ-ACK transmitted by the terminal apparatus 1.

Moreover, a subframe in which transmission of HARQ-ACK for transmission (decoding) on the PDSCH is performed is also referred to as a second subframe. For example, the second subframe is represented as subframe n. Here, uplink control information may be transmitted in the second subframe.

Specifically, the terminal apparatus 1 may transmit the HARQ-ACK in subframe n for PDSCH transmission based on detection of the PDCCH is subframe n-4. The terminal apparatus 1 may transmit the HARQ-ACK in subframe n for single or multiple PDSCH transmissions in single or multiple subframes n-k (k∈K; K is single or multiple values). Here, the single or multiple PDSCH transmissions may be based on detection of single or multiple PDCCH.

As described above, the terminal apparatus 1 may use the first PUCCH resource and the first PUCCH format for the transmission of HARQ-ACK in the second subframe. Alternatively, the terminal apparatus 1 may use the third PUCCH resource and the third PUCCH format for the transmission of HARQ-ACK in the second subframe. Alternatively, the terminal apparatus 1 may use the fourth PUCCH resource and the fourth PUCCH format for the transmission of HARQ-ACK in the second subframe.

FIG. 7 is another diagram illustrating the method of transmitting uplink control information according to the present embodiment. Here, FIG. 7 illustrates a Pseudo code.

Specifically, FIG. 7 illustrates which of the first PUCCH resource, the third PUCCH resource, and the fourth PUCCH resource is used in a case that the terminal apparatus 1 transmits HARQ-ACK (uplink control information). In addition, FIG. 7 illustrates which of the first PUCCH format, the third. PUCCH format, and the fourth PUCCH format is used in a case that the terminal apparatus 1 transmits HARQ-ACK (uplink control information).

Here, FIG. 7 may illustrate an operation in transmission of HARQ-ACK (uplink control information) for FDD (for frame structure type 1 in a case that FDD is applied). FIG. 7 may be used in a case that FDD is applied for the primary cell in carrier aggregation in which TDD and FDD are applied to cells. FIG. 7 may illustrate an operation of the terminal apparatus 1 configured with PUCCH format 4.

As illustrated in FIG. 7, in a case that the value of the first information is set (configured) to "0", for transmission on the PDSCH only in the primary cell indicated by the detection of PDCCH in the CSS of the primary cell in the first subframe, the terminal apparatus 1 may use the first PUCCH resource and the first PUCCH format. In other words, in this case, the terminal apparatus 1 may use the first PUCCH resource and the first PUCCH format in a case that the PDCCH used for scheduling of transmission on the PDSCH only in the primary cell is detected in the CSS of the primary cell.

Here, the PDSCH in the primary cell may be scheduled by using only the PDCCH in the primary cell. In other words, the PDSCH in the primary cell may not be scheduled by using the PDCCH in the secondary cell.

In a case that the value of the first information is set (configured) to "0", for transmission on the PDSCH only in the primary cell indicated by the detection of PDCCH in the first subframe, the terminal apparatus 1 may use the first PUCCH resource and the first PUCCH format in a case that both the counter DAI value and the total DAI value are "0", Here, the PDCCH may be detected in the USS of the primary cell. In other words, in this case, in a case that the PDCCH used for scheduling of transmission on the PDSCH only in the primary cell is detected and both the counter DAI value and the total. DAI value are set to "0", the terminal apparatus 1 may use the first PUCCH resource and the first PUCCH format.

In the case that the value of the first information is set (configured) to "0", for transmission on the PDSCH in the secondary cell indicated by the detection of PDCCH in the first subframe, the terminal apparatus 1 may use the fourth PUCCH resource and the fourth PUCCH format, or the third PUCCH resource and the third PUCCH format.

Here, for transmission on the PDSCH in the primary cell and transmission on the PDSCH in the secondary cell, the terminal apparatus 1 may use the fourth PUCCH resource and the fourth PUCCH format, or the third PUCCH resource and the third PUCCH format. For transmission on the PDSCH in a secondary cell (first secondary cell) and transmission on the PDSCH in a secondary cell (second secondary cell), the terminal apparatus 1 may use the fourth PUCCH resource and the fourth PUCCH format, or the third PUCCH resource and the third PUCCH format.

In other words, for transmission on the PDSCH in at least one secondary cell indicated by the detection of PDCCH in the first subframe, the terminal apparatus 1 may use the fourth PUCCH resource and the fourth PUCCH format, or the third PUCCH resource and the third PUCCH format. In the following description, transmission on the PDSCH in the secondary cell may include the above-described transmission on the PDSCH in at least one secondary cell.

Specifically, in a case that the PDCCH used for scheduling of transmission on the PDSCH in at least one secondary cell is detected, the terminal apparatus 1 may use the fourth PUCCH resource and the fourth PUCCH format, or the third PUCCH resource and the third PUCCH format.

In the case that the value of the first information is set (configured) to "0", for transmission on the PDSCH only in the primary cell indicated by the detection of PDCCH in the first subframe, the terminal apparatus 1 may use the fourth PUCCH resource and the fourth PUCCH format, or the third PUCCH resource and the third PUCCH format in a case that one of the counter DAI value and the total DAI value is greater than "1". In other words, in this case, in a case that the PDCCH used for scheduling of transmission on the PDSCH only in the primary cell is detected and one of the counter DAI value and the total DAI value is set to a value greater than "1", the terminal apparatus 1 may use the fourth PUCCH resource and the fourth PUCCH format, or the third PUCCH resource and the third PUCCH format.

Here, the terminal apparatus 1 may determine which of the fourth PUCCH resource and the fourth PUCCH format, and the third PUCCH resource and the third PUCCH format are to be used, based on the number of bits (the total number of bits) of uplink control information (HARQ-ACK, SR, and/or periodic CSI) transmitted in the second subframe.

For example, in a case that the number of bits of the uplink control information transmitted in the second subframe is more than 22 bits (or may be equal to or more than 22 bits), the terminal apparatus 1 may use the fourth PUCCH resource and the fourth PUCCH format. In a case that the number of bits of the uplink control information transmitted in the second subframe is less than 22 bits or may be equal to or less than 22 bits), the terminal apparatus 1 may use the third PUCCH resource and the third PUCCH format.

In addition, in a case that the value of the first information is set (configured) to "1", for transmission on the PDSCH in the primary cell indicated by the detection of PDCCH in the first subframe, the terminal apparatus 1 may use the first PUCCH resource and the first PUCCH format.

In the case that the value of the first information is set (configured) to "1", for transmission on the PDSCH in the secondary cell indicated by the detection of PDCCH in the first subframe, the terminal apparatus 1 may use the fourth PUCCH resource and the fourth PUCCH format.

FIG. 8 is another diagram illustrating the method of transmitting uplink control information according to the present embodiment. Here, FIG. 8 illustrates the Pseudo code.

Specifically, FIG. 8 illustrates which of the first PUCCH resource, the third the PUCCH resource, and the fourth PUCCH resource is used in a case that the terminal apparatus 1 transmits HARQ-ACK (uplink control information). In addition, FIG. 8 illustrates which of the first PUCCH format, the third PUCCH format, and the fourth PUCCH format is used in the case that the terminal apparatus 1 transmits HARQ-ACK (uplink control information).

Here, FIG. 8 may illustrate an operation in transmission of HARQ-ACK (uplink control information) for TDD (for frame structure type 1 in a case that TDD is applied). FIG. 8 may be used for a case that TDD is applied to the primary cell in carrier aggregation in which TDD and FDD are applied to cells. FIG. 8 may illustrate an operation of the terminal apparatus 1 configured with PUCCH format 4.

As illustrated in FIG. 8, in a case that the value of the first information is set (configured) to "0", for transmission on the PDSCH only in the primary cell indicated by the detection of PDCCH in the CSS of the primary cell in the first subframe, the terminal apparatus 1 may use the first PUCCH resource and the first PUCCH format in a case that the counter DAI value is "1". In other words, in this case, in a case that the PDCCH used for scheduling of transmission on the PDSCH only in the primary cell is detected in the CSS of the primary cell and the counter DAI value is "1", the terminal apparatus 1 may use the first PUCCH resource and the first PUCCH format.

In the case that the value of the first information is set (configured) to "0", the terminal apparatus 1 may use the first PUCCH resource and the first PUCCH format for transmission on the PDSCH only in the primary cell indicated by the detection of PDCCH in the first subframe in a case that both the counter DAI value and the total DAI value are "1". Here, the PDCCH may be detected in the USS of the primary cell. In other words, in this case, in a case that the PDCCH used for scheduling of transmission on the PDSCH only in the primary cell is detected and both the counter DAI value and the total DAI value are set to "1", the terminal apparatus 1 may use the first PUCCH resource and the first PUCCH format.

In the case that the value of the first information is set (configured) to "0", for transmission on the PDSCH in the primary cell indicated by the detection of PDCCH in the first subframe, the terminal apparatus 1 may use the fourth PUCCH resource and the fourth PUCCH format, or the third PUCCH resource and the third PUCCH format in a case that one of the counter DAI value and the total DAI value is greater than "1". In other words, in this case, in a case that the PDCCH used for scheduling of transmission on the PDSCH in the primary cell is detected and one of the counter DAI value and the total DAI value is set to a value greater than "1", the terminal apparatus 1 may use the fourth PUCCH resource and the fourth PUCCH format, or the third PUCCH resource and the third PUCCH format.

In the case that the value of the first information is set (configured) to "0", for transmission on the PDSCH in the secondary cell indicated by the detection of PDCCH in the first subframe, the terminal apparatus 1 may use the fourth PUCCH resource and the fourth PUCCH format, or the third PUCCH resource and the third PUCCH format.

Here, the terminal apparatus 1 may determine which of the fourth PUCCH resource and the fourth PUCCH format, and the third PUCCH resource and the third PUCCH format are to be used, based on the number of hits (the total number of bits) of uplink control information (HARQ-ACK, SR, and/or periodic CSI) transmitted in the second subframe.

For example, in a case that the number of bits of the uplink control information transmitted in the second subframe is more than 22 bits (or is equal to or more than 22 bits), the terminal apparatus 1 may use the fourth PUCCH resource and the fourth PUCCH format. In a case that the number of hits of the uplink control information transmitted in the second subframe is less than 22 hits (or may be equal to or less than 22 bits), the terminal apparatus 1 may use the third PUCCH resource and the third PUCCH format.

FIG. 9 is another diagram illustrating the method of transmitting uplink control information according to the present embodiment. Here, FIG. 9 illustrates the Pseudo code. FIG. 9 illustrates an operation of the case that "1" is set as the value of the first information in FIG. 8.

As illustrated in FIG. 9, in a case that the value of the first information is set (configured) to "1", for transmission on the PDSCH only in the primary cell indicated by the detection of PDCCH in the first subframe, the terminal apparatus 1 may use the first PUCCH resource and the first PUCCH format in a case that the value of the DAI is "1". Here, in this case, the TDD uplink/downlink configuration (TDD UL/DL configuration) may be configured to any of 1, 2, 3, 4, 5, and 6. In other words, in this case, the TDD uplink/downlink configuration may not be set to 0. The value of the DAI may be the counter DAI value. In other words, in this case, in a case that the PDCCH used for scheduling of transmission on the PDSCH only in the primary cell is detected and the value of the DAI is set to "0", the terminal apparatus 1 may use the first PUCCH resource and the first PUCCH format.

As illustrated in FIG. 9, in the case that the value of the first information is set (configured) to "1", for transmission on the PDSCH only in the primary cell indicated by the detection of PDCCH in the first subframe, the terminal apparatus 1 may use the first PUCCH resource and the first PUCCH format in a case that the value of the DAI is "1". Here, in this case, the TDD uplink/downlink configuration (TDD UL/DL configuration) may be configured to any of 1, 2, 3, 4, 5, and 6. In other words, in this case, the TDD uplink/downlink configuration may not be set to 0. The value of the DAI may be the counter DAI value. In other words, in this case, in the case that the PDCCH used for scheduling of transmission on the PDSCH only in the primary cell is detected and the value of the DAI is set to "0", the terminal apparatus 1 may use the first PUCCH resource and the first PUCCH format.

In the case that the value of the first information is set (configured) to "1", for transmission on the PDSCH only in the primary cell indicated by the detection of PDCCH in the first subframe, the terminal apparatus 1 may use the fourth. PUCCH resource and the fourth PUCCH format in a case that the value of the DAI is greater than "1". Here, the value of the DAI may be the counter DAI value. That is, in this case, in a case that the PDCCH used for scheduling of transmission on the PDSCH only in the primary cell is detected and the value of the DAI is set to a value greater than "1", the terminal apparatus 1 may use the fourth PUCCH resource and the fourth PUCCH format.

In a case that the value of the first information is set (configured) to "1", and the TDD uplink/downlink configurations of all serving cells are the same, for transmission on the PDSCH in the secondary cell indicated by the detection of PDCCH in the first subframe, the terminal apparatus 1 may use the fourth PUCCH resource and the fourth PUCCH format. In other words, in this case, the terminal apparatus 1 may use the fourth. PUCCH resource and the fourth PUCCH format in a case that the PDCCH used for scheduling of transmission on the PDSCH in the secondary cell is detected.

In a case that the value of the first information is set (configured) to "1", and the TDD uplink/downlink configurations of at least two serving cells are different from each other, for transmission on the PDSCH in the secondary cell indicated by the detection of PDCCH in the first subframe, the terminal apparatus 1 may use the fourth PUCCH resource and the fourth PUCCH format. In other words, in this case, the terminal apparatus 1 may use the fourth PUCCH resource and the fourth PUCCH format in a case that the PDCCH used for scheduling of transmission on the PDSCH in the secondary cell is detected.

Figure 10:
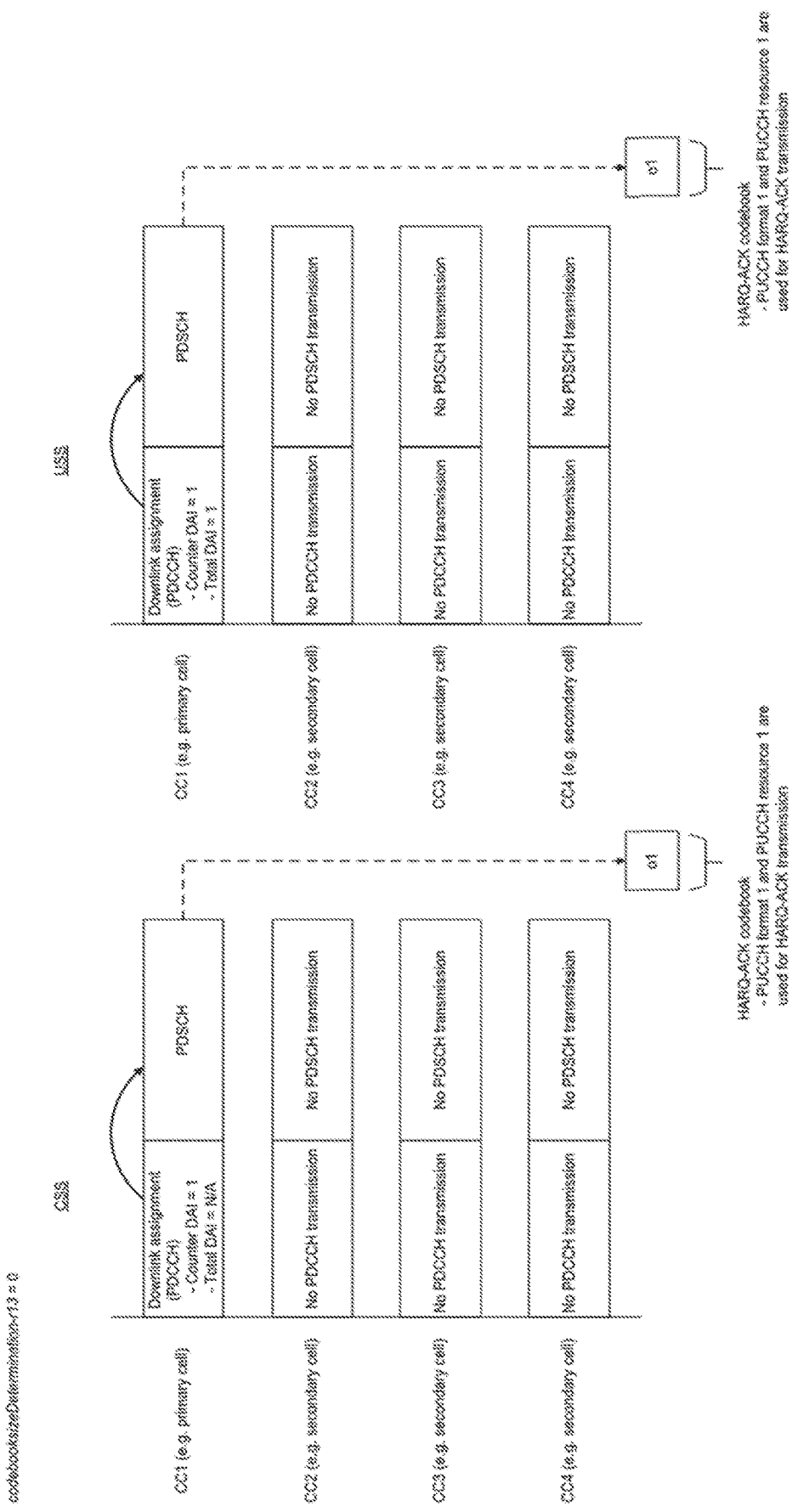
FIG. 10 is another diagram illustrating the method of transmitting uplink control information according to the present embodiment.

FIG. 10 is another diagram illustrating the method of transmitting uplink control information according to the present embodiment. Here, FIG. 10 corresponds to FIG. 8. In other words, FIG. 10 may illustrate an operation in transmission of HARQ-ACK (uplink control information) for TDD (for frame structure type 1 in a case that TDD is applied). FIG. 10 may be used for a case that TDD is applied to the primary cell in carrier aggregation in which TDD and FDD are applied to cells. FIG. 10 may illustrate an operation of the terminal apparatus 1 configured with PUCCH format 4.

In the following description, o1, o2, . . . , oX represent a bit(s) of the HARQ-ACK. Specifically, for example, o1 represents a case that the number of bits of the HARQ-ACK (the codebook size of HARQ-ACK) is 1 bit. Moreover, o1, o2, o3 represents a case that the number of bits of the HARQ-ACK (the codebook size of HARQ-ACK) is 3 bits.

As illustrated in FIG. 10, the terminal apparatus 1 may use the first PUCCH resource and the first PUCCH format in a case that the first information (first information set to "0") is received, the PDCCH used for scheduling of transmission on the PDSCH only in the primary cell is detected in the CSS of the primary cell, and the counter DAI value included in the downlink assignment is set to "1".

The terminal apparatus 1 may use the first PUCCH resource and the first PUCCH format in a case that the first information (first information set to "0") is received, the PDCCH used for scheduling of transmission on the PDSCH only in the primary cell is detected in the USS of the primary cell, and both the counter DAI value and the total DAI value included in the downlink assignment are set to "1".

Figure 11:
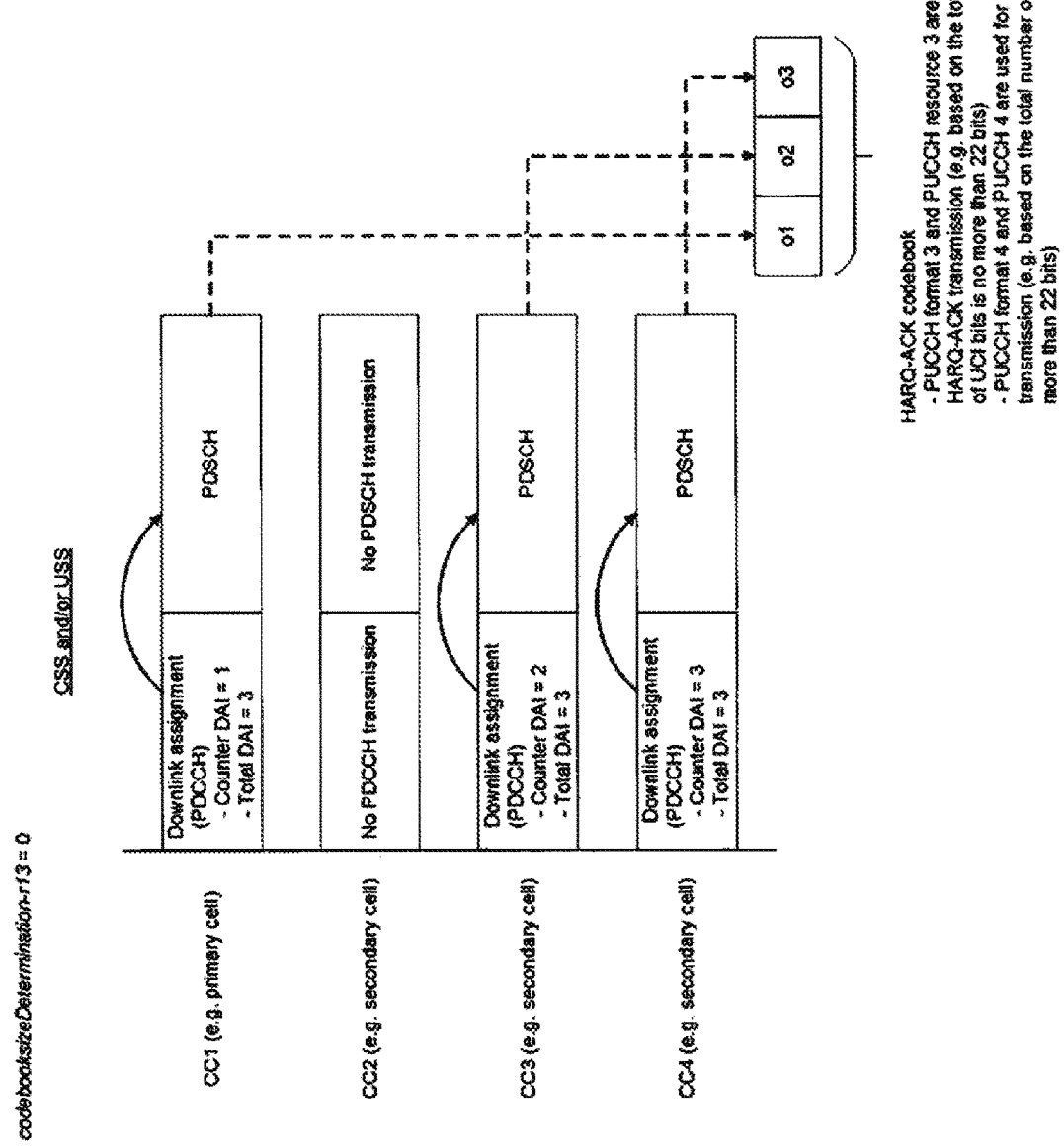
FIG. 11 is another diagram illustrating the method of transmitting uplink control information according to the present embodiment.

FIG. 11 is another diagram illustrating the method of transmitting uplink control information according to the present embodiment. Here, FIG. 11 corresponds to FIG. 8. In other words, FIG. 11 may illustrate an operation in transmission of HARQ-ACK (uplink control information) for TDD (for frame structure type 1 in a case that TDD is applied). FIG. 11 may be used for a case that TDD is applied to the primary cell in carrier aggregation in which TDD and FDD are applied to cells. FIG. 11 may illustrate an operation of the terminal apparatus 1 configured with PUCCH format 4.

As illustrated in FIG. 11, the terminal apparatus 1 may use the fourth PUCCH resource and the fourth PUCCH format or the third PUCCH resource and the third PUCCH format in a case that the first information (first information set to "0") is received, and the PDCCH used for scheduling of transmission on the PDSCH in the secondary cell (or transmission on the PDSCH in at least one secondary cell) is detected.

Here, the terminal apparatus 1 may use the fourth PUCCH resource and the fourth PUCCH format or the third PUCCH resource and the third PUCCH format in a case that the first information (first information set to "0") is received, the PDCCH used for scheduling of transmission on the PDSCH in the primary cell (or transmission of PDSCH only in the primary cell) is detected, and one of the counter DAI value and the total DAI value included in downlink assignment is greater than "1". Here, in FIG. 11, the total DAI value is set to "3".

Here, as described above, the terminal apparatus 1 may use the fourth PUCCH resource and the fourth PUCCH format, based on the number of bits of the UCI, for example. The terminal apparatus 1 may use the third PUCCH resource and the third PUCCH format, based on the number of bits of the UCI.

Transmitting the uplink control information as illustrated in FIG. 11 allow the transmission of the uplink control information without causing inconsistency in number of bits of the HARQ-ACK (HARQ-ACK codebook size) between the base station apparatus 3 and the terminal apparatus 1. For example, even in a case that the terminal apparatus 1 has not detected the downlink assignment that is transmitted in the CC3, the terminal apparatus 1 can detect the value of the DAI included in the downlink assignment in the CC4 (the counter DAI value and the total DAI value) to determine the number of bits of the HARQ-ACK. In addition, the terminal apparatus 1 can detect failure of detection of downlink assignment that is transmitted in the CC3 by detecting the value of the DAI included in downlink assignment in the CC4 (the counter DAI value and the total DAI value).

Figure 12:
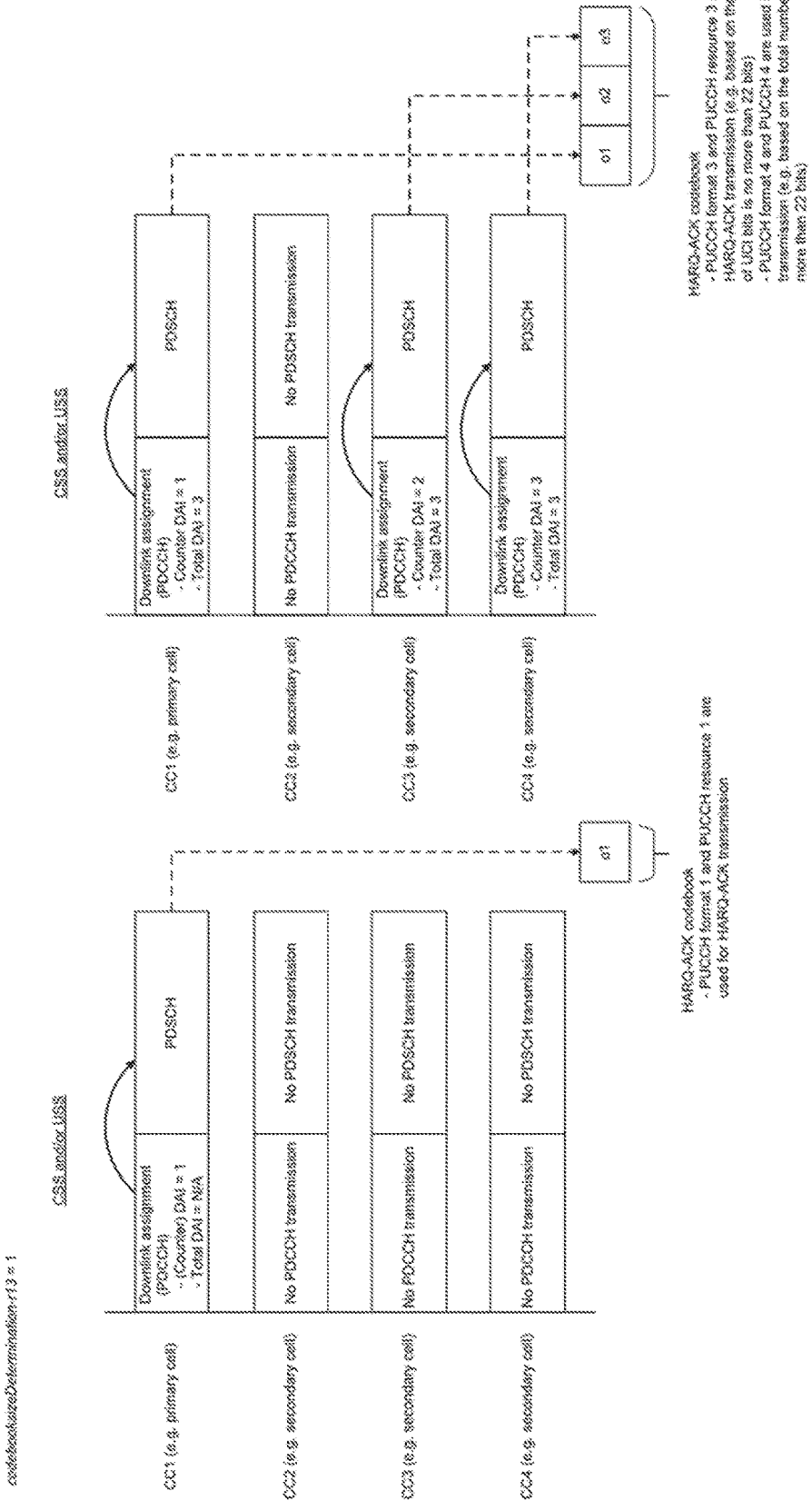
FIG. 12 is another diagram illustrating the method of transmitting uplink control information according to the present embodiment.

FIG. 12 is another diagram illustrating the method of transmitting uplink control information according to the present embodiment. Here, FIG. 12 corresponds to FIG. 9. In other words, FIG. 12 may illustrate an operation in transmission of HARQ-ACK (uplink control information) for TDD (for frame structure type 1 in a case that TDD is applied). FIG. 12 may be used for a case that TDD is applied to the primary cell in carrier aggregation in which TDD and FDD are applied to cells. FIG. 12 may illustrate an operation of the terminal apparatus 1 configured with PUCCH format 4.

As illustrated in FIG. 12, the terminal apparatus 1 may use the first PUCCH resource and the first PUCCH format in a case that the first information (first information set to "1") is received, the PDCCH used for scheduling of transmission on the PDSCH only in the primary cell is detected in the CSS of the primary cell, and the value of the DAI included in the downlink assignment (or the counter DAI value) is set to "1".

The terminal apparatus 1 may use the fourth PUCCH resource and the fourth PUCCH format or the third PUCCH resource and the third PUCCH format in a case that the first information (first information set to "1") is received, and the PDCCH used for scheduling of transmission on the PDSCH in the secondary cell (or transmission on the PDSCH in at least one secondary cell) is detected.

Here, the terminal apparatus 1 may use the fourth PUCCH resource and the fourth PUCCH format or the third PUCCH resource and the third PUCCH format in a case that the first information (first information set to "1") is received, the PDCCH used for scheduling of transmission on the PDSCH in the primary cell (or transmission of PDSCH only in the primary cell) is detected, and one of the counter DAI value and the total DAI value included in downlink assignment is greater than "1". Here, the total DAI value is set to "3" in FIG. 12 (the right side in FIG. 12).

Here, as described above, the terminal apparatus 1 may use the fourth PUCCH resource and the fourth PUCCH format, based on the number of bits of the UCI, for example. The terminal apparatus 1 may use the third PUCCH resource and the third PUCCH format, based on the number of bits of the UCI.

Structures of apparatuses according to the present embodiment will be described below.

Figure 13:
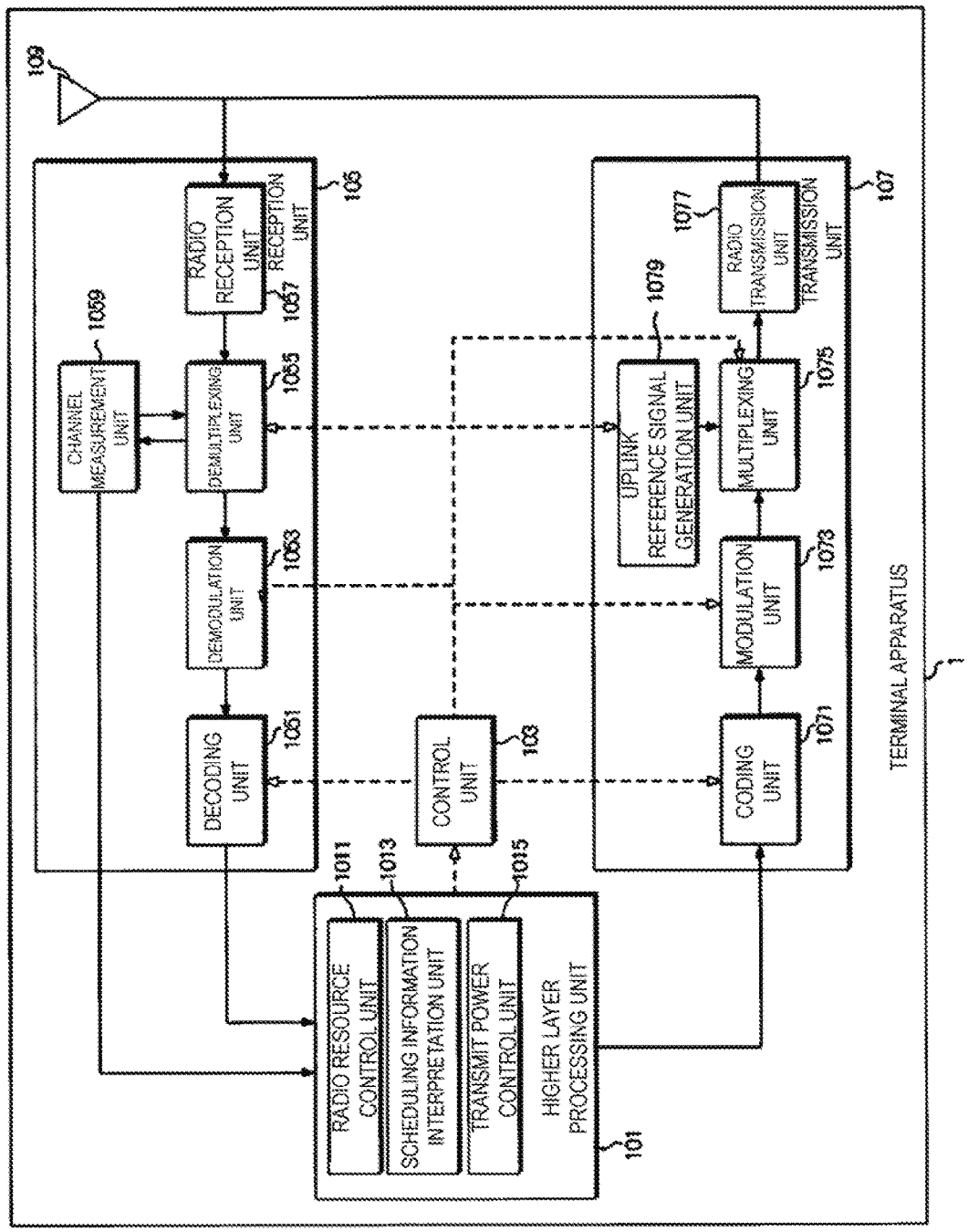
FIG. 13 is a schematic block diagram illustrating a configuration of a terminal apparatus 1 according to the present embodiment.

FIG. 13 is a schematic block diagram illustrating a configuration of the terminal apparatus 1 according to the present embodiment. As illustrated in FIG. 13, the terminal apparatus 1 is configured to include a higher layer processing unit 101, a control unit 103, a reception unit 105, a transmission unit 107, and a transmit and/or receive antenna 109. The higher layer processing unit 101 is configured, including a radio resource control unit 1011, a scheduling information interpretation unit 1013, and a transmit power control unit 1015. The reception unit 105 is configured to include a decoding unit 1051, a demodulation unit 1053, a demultiplexing unit 1055, a radio reception unit 1057, and a channel measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various configuration information/parameters of the terminal apparatus 1 itself. The radio resource control unit 1011 sets the various configuration information/parameters in accordance with higher layer signaling received from the base station apparatus 3. TO be more specific, the radio resource control unit 1011 sets the various configuration information/parameters in accordance with the information indicating the various configuration information/parameters received from the base station apparatus 3. Furthermore, the radio resource control unit 1011 generates information to be mapped to each uplink channel, and outputs the generated information to the transmission unit 107. The radio resource control unit 1011 is also referred to as a configuration unit 1011.

Here, the scheduling information interpretation unit 1013 included in the higher layer processing unit 101 interprets the DCI format (scheduling information) received through the reception unit 105, generates control information for control of the reception unit 105 and the transmission unit 107, in accordance with a result of interpreting the DCI format, and outputs the generated control information to the control unit 103.

The transmit power control unit 1015 included in the higher layer processing unit 101 controls the transmit power for transmission on the PUSCH and the PUCCH in accordance with various configuration information/parameters managed by the radio resource control unit 1011, a TPC command, and the like.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station apparatus 3 through the transmit and/or receive antenna 109, and outputs the information resulting from the decoding, to the higher layer processing unit 101.

The radio reception unit 1057 converts (down-converts) a downlink signal received through the transmit and/or receive antenna 109 into a baseband signal through orthogonal demodulation, removes unnecessary frequency components, controls an amplification level in such a manner as to suitably maintain a signal level, performs orthogonal demodulation, based on an in-phase component and an orthogonal component of the received signal, and converts the resulting orthogonally-demodulated analog signal into a digital signal. The radio reception unit 1057 removes a portion corresponding to a Cyclic Prefix (CP) from the digital signal resulting from the conversion, performs Fast Fourier Transform (FFT) on the signal from which the CP has been removed, and extracts a signal in the frequency domain.

The demultiplexing unit 1055 demultiplexes the extracted signal into the PHICH, the PDCCH, the EPDCCH, the PDSCH, and the downlink reference signal. Moreover, the demultiplexing unit 1055 makes a compensation of channels including the PHICH, the PDCCH, the EPDCCH, and the PDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal apparatus 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data in accordance with information of a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI (or the CSI).

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station apparatus 3 through the transmit and/or receive antenna 109. Furthermore, the transmission unit 107 transmits uplink control information.

The coding unit 1071 performs coding, such as convolutional coding or block coding, on the uplink control information input from the higher layer processing unit 101. Furthermore, the coding unit 1071 performs turbo coding in accordance with information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme predetermined in advance for each channel. In accordance with the information used for the scheduling of the PUSCH, the modulation unit 1073 determines the number of data sequences to be spatial-multiplexed, maps multiple pieces of uplink data to be transmitted on the same PUSCH to multiple sequences through Multiple Input Multiple Output Spatial Multiplexing (MIMO SM), and performs preceding on the sequences.

The uplink reference signal generation unit 1079 generates a sequence acquired in accordance with a rule (formula) predetermined in advance, based on a physical layer cell identifier (also referred to as a Physical cell identity (PCI), a Cell ID, or the like) for identifying the base station apparatus 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs Inverse Fast Fourier Transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and/or receive antenna 109 for transmission.

Figure 14:
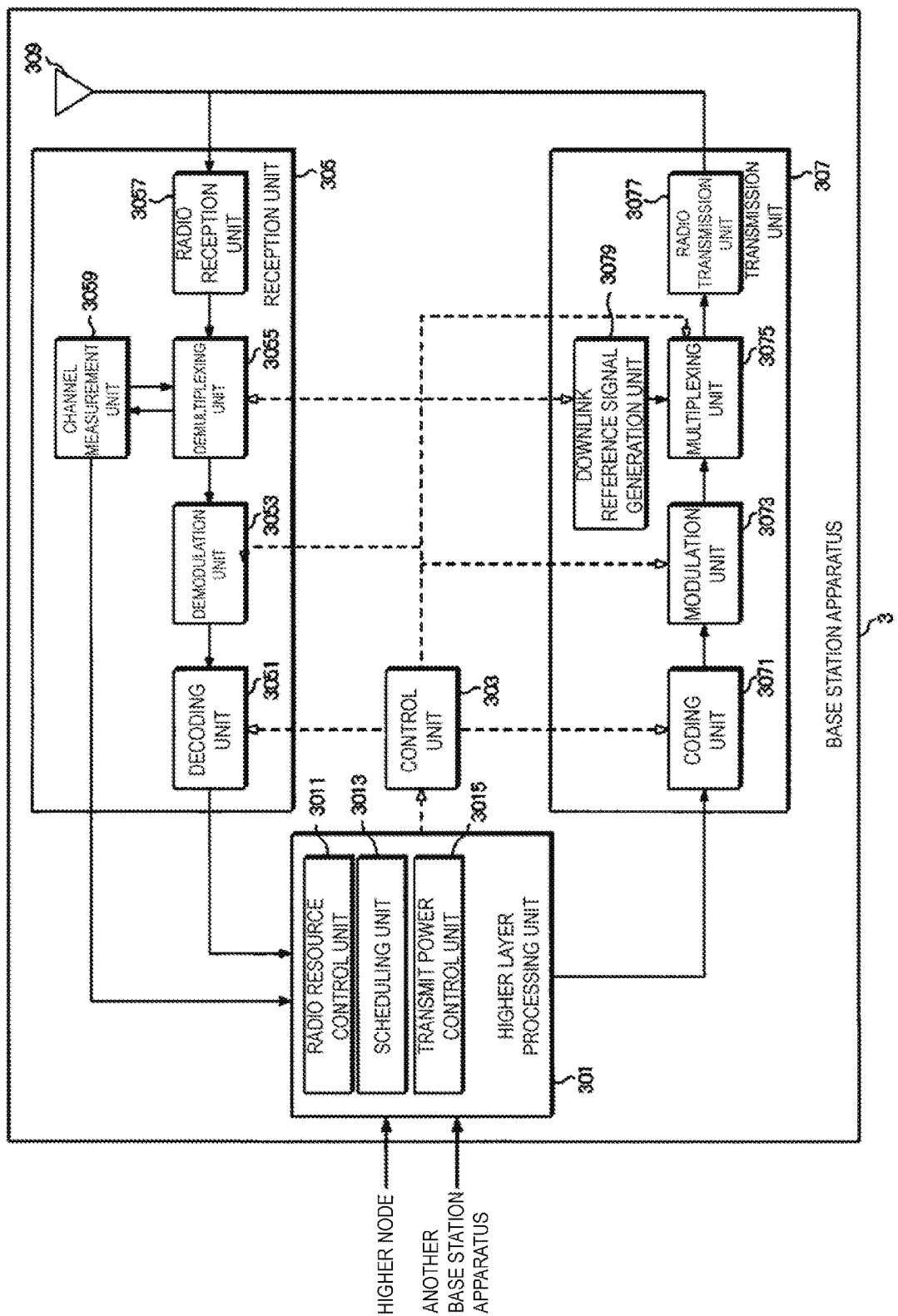
FIG. 14 is a schematic block diagram illustrating a configuration of a base station apparatus 3 according to the present embodiment.

FIG. 14 is a schematic block diagram illustrating a configuration of the base station apparatus 3 according to the present embodiment. As illustrated in FIG. 14, the base station apparatus 3 is configured to include a higher layer processing unit 301, a control unit 303, a reception unit 305, a transmission unit 307, and a transmit and/or receive antenna 309. The higher layer processing unit 301 is configured, including a radio resource control unit 3011, a scheduling unit 3013, and a transmit power control unit 3015. The reception unit 305 is configured to include a decoding unit 3051, a demodulation unit 3053, a demultiplexing unit 3055, a radio reception unit 3057, and a channel measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the Medium Access Control (MAC) layer, the Packet Data. Convergence Protocol (PDCP) layer, the Radio Link Control (RLC) layer, and the Radio Resource Control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PDSCH, system information, the RRC message, the MAC Control Element (CE), and the like, and outputs a result of the generation or the acquirement to the transmission unit 307. Furthermore, the radio resource control unit 3011 manages various configuration information/parameters for each of the terminal apparatuses 1. The radio resource control unit 3011 may configure various configuration information/parameters for each of the terminal apparatuses 1 through higher layer signaling. In other words, the radio resource control unit 1011 transmits/broadcasts information indicating various configuration information/parameters. The radio resource control unit 3011 is also referred to as a configuration unit 3011.

The scheduling unit 3013 included in the higher layer processing unit 301 determines a frequency and a subframe to which the physical channels (PDSCH and PUSCH) are allocated, the coding rate and modulation scheme for the physical channels (PDSCH and PUSCH), the transmit power, and the like, from the received channel state information and from the channel estimate, channel quality, or the like input from the channel measurement unit 3059. The scheduling unit 3013 generates the control information e.g., the DCI format) in order to control the reception unit 305 and the transmission unit 307 in accordance with a result of the scheduling, and outputs the generated information to the control unit 303. The scheduling unit 3013 further determines timing of performing transmission processing and reception processing.

The transmit power control unit 3015 included in the higher layer processing unit 301 controls the transmit power for transmission on the PUSCH and the PUSCH performed by the terminal apparatus 1, in accordance with various configuration information/parameters managed by the radio resource control unit 3011, a TPC command, and the like.

In accordance with the control information originating from the higher layer processing unit 301, the control unit 303 generates a control signal for control of the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal apparatus 1 through the transmit and/or receive antenna 309, and outputs information resulting from the decoding to the higher layer processing unit 301. The radio reception unit 3057 converts (down-converts) an uplink signal received through the transmit and/or receive antenna 309 into a baseband signal through orthogonal demodulation, removes unnecessary frequency components, controls the amplification level in such a manner as to suitably maintain a signal level, performs orthogonal demodulation, based on an in-phase component and an orthogonal component of the received signal, and converts the resulting orthogonally-demodulated analog signal into a digital signal. The reception unit 305 receives the uplink control information.

The radio reception unit 3057 removes a portion corresponding to a Cyclic Prefix (CP) from the digital signal resulting from the conversion. The radio reception unit 3057 performs Fast Fourier Transform (FFT) on the signal from which the CP has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. The demultiplexing is performed based on radio resource allocation information that is determined in advance by the base station apparatus 3 using the radio resource control unit 3011 and that is included in the uplink grant notified to each of the terminal apparatuses 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and the PUSCH, in compliance with the modulation scheme predetermined in advance, such as Binary Phase Shift Keying (BPSK), QPSK, 16 QAM, or 64 QAM, or in compliance with the modulation scheme that the base station apparatus 3 itself notified in advance with the uplink grant each of the terminal apparatuses 1. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal apparatuses 1 and information indicating the precoding to be performed on the sequences.

The decoding unit 3051 decodes the coded bits of the PUCCH and the PUSCH, which have been demodulated, at the coding rate in compliance with a coding scheme predetermined in advance, the coding rate being predetermined in advance or being notified in advance with the uplink grant to the terminal apparatus 1 by the base station apparatus 3 itself, and outputs the decoded uplink data and uplink control information to the higher layer processing unit 101. In a case that the PUSCH is re-transmitted, the decoding unit 3051 performs the decoding with the coded bits input from the higher layer processing unit 301 and retained in an HARQ buffer, and the demodulated coded bits. The channel measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal apparatus 1 through the transmit and/or receive antenna 309.

The coding unit 3071 codes the HARQ indicator, the downlink control information, and the downlink data that are input from the higher layer processing unit 301, in compliance with the coding scheme predetermined in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme predetermined in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal apparatus 1 and that is acquired in accordance with a rule predetermined in advance, based on the Physical layer Cell Identifier (PCI) for identifying the base station apparatus 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmission unit 3077 performs Inverse Fast Fourier Transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and/or receive antenna 309 for transmission.

More specifically, the terminal apparatus 1 of the present embodiment includes: the reception unit 105 configured to receive higher layer signaling including first information for configuring that the number of bits of HARQ-ACK is determined based on downlink assignment, and to receive the downlink assignment on a PDCCH; and the transmission unit 107 configured to transmit the HARQ-ACK, wherein the transmission unit 107 transmits the HARQ-ACK by using a first. PUCCH format in a case that the first information is received, a PDCCH used for scheduling of a PDSCH transmission only on a primary cell is detected in a CSS on the primary cell, and a counter DAI value included in the downlink assignment is set to 1, transmits the HARQ-ACK by using the first PUCCH format in a case that the first information is received, the PDCCH used for scheduling of the PDSCH transmission only on the primary cell is detected in a USS on the primary cell, and both the counter DAI value and a total DAI value included in the downlink assignment are set to 1, and transmits the HARQ-ACK by using one of a third PUCCH format and a fourth PUCCH format in a case that the first information is received, the PDCCH used for scheduling of the PDSCH transmission only on the primary cell is detected, and either the counter DAI value or the total DAI value included in the downlink assignment is set to a value greater than 1.

The transmission unit 107 transmits the HARQ-ACK by using the third PUCCH format in a case that the number of bits of the HARQ-ACK is smaller than a prescribed number, and transmits the HARQ-ACK by using the fourth PUCCH format in a case that the number of bits of the HARQ-ACK is greater than the prescribed number.

The transmission unit 107 transmits the HARQ-ACK by using a first PUCCH resource in the case that the first information is received, the PDCCH used for scheduling of the PDSCH transmission only on the primary cell is detected in the CSS of the primary cell, and the counter DAI value included in the downlink assignment is set to 1, transmits the HARQ-ACK by using the first PUCCH resource in the case that the first information is received, the PDCCH used for scheduling of the PDSCH transmission only on the primary cell is detected in the USS on the primary cell, and both the counter DAI value and the total DAI value included in the downlink assignment are set to 1, and transmits the HARQ-ACK by using one of a third PUCCH resource and a fourth PUCCH resource in the case that the first information is received, the PDCCH used for scheduling of the PDSCH transmission only on the primary cell is detected, and either the counter DAI value or the total DAI value included in the downlink assignment is set to a value greater than 1.

The transmission unit 107 transmits the HARQ-ACK by using the third PUCCH resource in a case that the number of bits of the HARQ-ACK is smaller than a prescribed number, and transmits the HARQ-ACK by using the fourth PUCCH resource in a case that the number of bits of the HARQ-ACK is greater than the prescribed number.

The base station apparatus 3 of the present embodiment includes: the transmission unit 307 configured to transmit higher layer signaling including first information for configuring that the number of bits of HARQ-ACK is determined based on downlink assignment, and to transmit the downlink assignment on a PDCCH; and the reception unit 305 configured to receive the HARQ-ACK, wherein the reception unit 305 receives the HARQ-ACK by using a first PUCCH format in a case that the first information is transmitted, a PDCCH used for scheduling of a PDSCH transmission only on a primary cell is transmitted in a CSS on the primary cell, and a counter DAI value included in the downlink assignment is set to 1, receives the HARQ-ACK by using the first PUCCH format in a case that the first information is transmitted, the PDCCH used for scheduling of the PDSCH transmission only on the primary cell is transmitted in a USS on the primary cell, and both the counter DAI value and a total DAI value included in the downlink assignment are set to 1, and receives the HARQ-ACK by using one of a third PUCCH format and a fourth PUCCH format in a case that the first information is transmitted, the PDCCH used for scheduling of the PDSCH transmission only on the primary cell is transmitted, and either the counter DAI value or the total DAI value included in the downlink assignment is set to a value greater than 1.

The reception unit 305 receives the HARQ-ACK by using the third PUCCH format in a case that the number of bits of the HARQ-ACK is smaller than a prescribed number, and receives the HARQ-ACK by using the fourth PUCCH format in a case that the number of bits of the HARQ-ACK is greater than the prescribed number.

The reception unit 305 receives the HARQ-ACK, by using a first PUCCH resource in the case that the first information is transmitted, the PDCCH used for scheduling of the PDSCH transmission only on the primary cell is transmitted in the CSS of the primary cell, and the counter DAI value included in the downlink assignment is set to 1, receives the HARQ-ACK by using the first PUCCH resource in the case that the first information is transmitted, the PDCCH used for scheduling of the PDSCH transmission only on the primary cell is transmitted in the USS on the primary cell, and both the counter DAI value and the total DAI value included in the downlink assignment are set to 1, and receives the HARQ-ACK by using one of a third PUCCH resource and a fourth PUCCH resource in the case that the first information is transmitted, the PDCCH used for scheduling of the PDSCH transmission only on the primary cell is transmitted, and either the counter DAI value or the total DAI value included in the downlink assignment is set to a value greater than 1.

The reception unit 305 receives the HARQ-ACK by using the third PUCCH resource in a case that the number of bits of the HARQ-ACK is smaller than a prescribed number, and receives the HARQ-ACK by using the fourth PUCCH resource in a case that the number of bits of the HARQ-ACK is greater than the prescribed number.

According to the above, the uplink control information can be transmitted efficiently.

A program running on each of the base station apparatus 3 and the terminal apparatus 1 according to the present invention may serve as a program that controls a Central Processing Unit (CPU) and the like (a program for causing a computer to operate) in such a manner as to enable the functionalities according to the above-described embodiments of the present invention. The information handled in these apparatuses is temporarily stored in a Random Access Memory (RAM) while being processed. Thereafter, the information is stored in various types of Read Only Memory (ROM) such as a Flash ROM and a Hard Disk Drive (HDD), and as necessary, is read by the CPU to be modified or rewritten.

Moreover, the terminal apparatus 1 and the base station apparatus 3 according to the above-described embodiments may be partially achieved by a computer. In this case, this configuration may be realized by recording a program for realizing such control functions on a computer-readable recording medium and causing a computer system to read the program recorded on the recording medium for execution.

Note that it is assumed that the "computer system" refers to a computer system built into the terminal apparatus 1 or the base station apparatus 3, and the computer system includes an OS and hardware components such as a peripheral device.

Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station apparatus 3 according to the above-described embodiments is achieved as an aggregation (a device group) constituted of multiple devices. Each of the devices constituting such a device group may include some or all portions of each function or each functional block of the base station apparatus 3 according to the above-described embodiments. The device group may include each general function or each functional block of the base station apparatus 3. Furthermore, the terminal apparatus 1 according to the above-described embodiments can also communicate with the base station apparatus as the aggregation.

Furthermore, the base station apparatus 3 according to the above-described embodiments may serve as an Evolved Universal Terrestrial Radio Access Network (EUTRAN). Furthermore, the base station apparatus 3 according to the above-described embodiments may have some or all portions of the functions of a node higher than an eNodeB.

Furthermore, some or all portions of each of the terminal apparatus 1 and the base station apparatus 3 according to the above-described embodiments may be achieved as an LSI which is a typical integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiments, the terminal apparatus has been described as an example of a communication device, but the present invention is not limited to such a terminal apparatus, and is applicable to a terminal apparatus or a communication device of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiments is also included in the technical scope of the present invention.

REFERENCE SIGNS LIST 1 (1A, 1B, 1C) Terminal apparatus
3 Base station apparatus
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling information interpretation unit
1015 Transmit power control unit
3011 Radio resource control unit
3013 Scheduling unit
3015 Transmit power control unit

The invention claimed is:

1. A terminal apparatus comprising:
reception circuitry that
receives a higher layer signal including first information used for configuring that a number of bits of Hybrid Automatic Repeat Request-Acknowledgment (HARQ-ACK) is determined by Downlink Assignment Index (DAI) based solution, and
receives downlink control information on a physical downlink control channel (PDCCH); and
transmission circuitry that transmits the HARQ-ACK, wherein
the HARQ-ACK is transmitted using a first physical uplink control channel (PUCCH) format in a case that the first information is received, the PDCCH is detected in a common search space on a primary cell, and a counter DAI value in the PDCCH is set to 1, the PDCCH being used for scheduling of a physical downlink shared channel (PDSCH) transmission only on the primary cell,
the HARQ-ACK is transmitted using the first PUCCH format in a case that the first information is received, the PDCCH is detected in a user equipment search space on a primary cell, and both the counter DAI value and a total DAI value in the PDCCH are set to 1, the PDCCH being used for scheduling of the PDSCH transmission only on the primary cell, and
the HARQ-ACK is transmitted using one of a second PUCCH format and a third PUCCH format in a case that the first information is received, the PDCCH is detected, and either the counter DAI value or the total DAI value in the PDCCH is greater than 1, the PDCCH being used for scheduling of a PDSCH transmission only on the primary cell.

2. The terminal apparatus according to claim 1, wherein
the HARQ-ACK is transmitted using a second PUCCH format in a case that the number of bits of HARQ-ACK is smaller than a predetermined number, and
the HARQ-ACK is transmitted using a third PUCCH format in a case that the number of bits of HARQ-ACK is larger than the predetermined number.

3. A base station apparatus comprising:
transmission circuitry that
transmits a higher layer signal including first information used for configuring that a number of bits of Hybrid Automatic Repeat Request-Acknowledgment (HARQ-ACK) is determined by Downlink Assignment Index (DAI) based solution, and
transmits downlink control information on a physical downlink control channel (PDCCH); and
reception circuitry that receives the HARQ-ACK, wherein
the HARQ-ACK is received using a first physical uplink control channel (PUCCH) format in a case that the first information is received, the PDCCH is detected in a common search space on a primary cell, and a counter DAI value in the PDCCH is set to 1, the PDCCH being used for scheduling of a physical downlink shared channel (PDSCH) transmission only on the primary cell,
the HARQ-ACK is received using the first PUCCH format in a case that the first information is received, the PDCCH is detected in a user equipment search space on a primary cell, and both the counter DAI value and a total DAI value in the PDCCH are set to 1, the PDCCH being used for scheduling of the PDSCH transmission only on the primary cell, and
the HARQ-ACK is received using one of a second PUCCH format and a third PUCCH format in a case that the first information is received, the PDCCH is detected, and either the counter DAI value or the total DAI value in the PDCCH is greater than 1, the PDCCH being used for scheduling of a PDSCH transmission only on the primary cell.

4. The base station apparatus according to claim 3, wherein
the HARQ-ACK is received using a second PUCCH format in a case that the number of bits of HARQ-ACK is smaller than a predetermined number, and
the HARQ-ACK is received using a third PUCCH format in a case that the number of bits of HARQ-ACK is larger than the predetermined number.

5. A communication method of a terminal apparatus comprising:
receiving a higher layer signal including first information used for configuring that a number of bits of Hybrid Automatic Repeat Request-Acknowledgment (HARQ-ACK) is determined by Downlink Assignment Index (DAI) based solution;
receiving downlink control information on a physical downlink control channel (PDCCH); and
transmitting the HARQ-ACK, wherein
the HARQ-ACK is transmitted using a first physical uplink control channel (PUCCH) format in a case that the first information is received, the PDCCH is detected in a common search space on a primary cell, and a counter DAI value in the PDCCH is set to 1, the PDCCH being used for scheduling of a physical downlink shared channel (PDSCH) transmission only on the primary cell,
the HARQ-ACK is transmitted using the first PUCCH format in a case that the first information is received, the PDCCH is detected in a user equipment search space on a primary cell, and both the counter DAI value and a total DAI value in the PDCCH are set to 1, the PDCCH being used for scheduling of the PDSCH transmission only on the primary cell, and
the HARQ-ACK is transmitted using one of a second PUCCH format and a third PUCCH format in a case that the first information is received, the PDCCH is detected, and either the counter DAI value or the total DAI value in the PDCCH is greater than 1, the PDCCH being used for scheduling of a PDSCH transmission only on the primary cell.

6. The communication method according to claim 5, wherein
the HARQ-ACK is transmitted using a second PUCCH format in a case that the number of bits of HARQ-ACK is smaller than a predetermined number, and
the HARQ-ACK is transmitted using a third PUCCH format in a case that the number of bits of HARQ-ACK is larger than the predetermined number.

7. A communication method of a base station apparatus comprising:
transmitting a higher layer signal including first information used for configuring that a number of bits of Hybrid Automatic Repeat Request-Acknowledgment (HARQ-ACK) is determined by Downlink Assignment Index (DAI) based solution;
transmitting downlink control information on a physical downlink control channel (PDCCH); and
receiving the HARQ-ACK, wherein
the HARQ-ACK is received using a first physical uplink control channel (PUCCH) format in a case that the first information is received, the PDCCH is detected in a common search space on a primary cell, and a counter DAI value in the PDCCH is set to 1, the PDCCH being used for scheduling of a physical downlink shared channel (PDSCH) transmission only on the primary cell,
the HARQ-ACK is received using the first PUCCH format in a case that the first information is received, the PDCCH is detected in a user equipment search space on a primary cell, and both the counter DAI value and a total DAI value in the PDCCH are set to 1, the PDCCH being used for scheduling of the PDSCH transmission only on the primary cell, and
the HARQ-ACK is received using one of a second PUCCH format and a third PUCCH format in a case that the first information is received, the PDCCH is detected, and either the counter DAI value or the total DAI value in the PDCCH is greater than 1, the PDCCH being used for scheduling of a PDSCH transmission only on the primary cell.

8. The communication method according to claim 7, wherein
the HARQ-ACK is received using a second PUCCH format in a case that the number of bits of HARQ-ACK is smaller than a predetermined number, and
the HARQ-ACK is received using a third PUCCH format in a case that the number of bits of HARQ-ACK is larger than the predetermined number.

* * * * *